(12) United States Patent
Katakura

(10) Patent No.: US 7,630,146 B2
(45) Date of Patent: Dec. 8, 2009

(54) TWO-UNIT ZOOM LENS AND IMAGE PICKUP APPARATUS EQUIPPED WITH SAME

(75) Inventor: Masahiro Katakura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/286,373

(22) Filed: Sep. 29, 2008

(65) Prior Publication Data

US 2009/0091845 A1    Apr. 9, 2009

(30) Foreign Application Priority Data

Oct. 5, 2007    (JP) .............................. 2007-262014

(51) Int. Cl.
*G02B 15/14*    (2006.01)
*G02B 9/10*    (2006.01)

(52) U.S. Cl. ...................... 359/691; 359/680

(58) Field of Classification Search ................ 359/676, 359/680, 683, 691; 348/240.99–240.3, 335–369, 348/72–88

See application file for complete search history.

(56) References Cited

U.S. PATENT DOCUMENTS

2002/0027710 A1 *  3/2002  Yonetani et al. ............. 359/434
2007/0121215 A1    5/2007  Sekita

FOREIGN PATENT DOCUMENTS

JP    2007-155836    6/2007

\* cited by examiner

*Primary Examiner*—Darryl J Collins
(74) *Attorney, Agent, or Firm*—Kenyon & Kenyon LLP

(57) ABSTRACT

A zoom lens includes, in order from the object side thereof, a first lens unit G1 having a negative refracting power and a second lens unit G2 having a positive refracting power. During zooming from the wide angle end to the telephoto end, the distance between the first lens unit G1 and the second lens unit G2 decreases. Letting the term "lens component" refer to a lens member whose surfaces that are in contact with air on the optical axis include only two surfaces, one being an object side surface and the other being an image side surface, the first lens unit G1 is comprised of a negative lens component in the form of a cemented lens having a negative refracting power that has, in order from the object side, a negative lens having a concave surface directed toward the image side and a positive lens having a convex surface directed toward the object side, and the second lens unit G2 includes a lens component in the form of a cemented lens having at least one negative lens and a positive lens.

22 Claims, 15 Drawing Sheets

US 7,630,146 B2

TWO-UNIT ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2007-262014 filed on Oct. 5, 2007; the entire contents of which are incorporated herein by reference.

BACKGROUND OF THE INVENTION

1. Field of the Invention

The present invention relates a small size zoom lens and a compact image pickup apparatus, such as a digital camera, equipped with such a small size zoom lens.

2. Description of the Related Art

Heretofore, in an image pickup apparatus such as a digital camera and a video camera, a high image quality, a high zooming ratio and thinning of a barrel frame have been sought.

For example, U.S. Published Application No. 2007/0121215 discloses a two-unit zoom lens that includes a first lens unit having a negative refracting power and a second lens unit having a positive refracting power. The first lens unit of this two-unit zoom lens is a cemented lens composed, in order from the object side, of a biconcave negative lens and a positive lens. This configuration is advantageous in achieving a reduction in the size of the zoom lens.

SUMMARY OF THE INVENTION

According to one aspect of the present invention, there is provided a two-unit zoom lens comprising, in order from an object side thereof:

a first lens unit having a negative refracting power; and a second lens unit having a positive refracting power, wherein during zooming from a wide angle end to a telephoto end, a distance between the first lens unit and the second lens unit decreases, the first lens unit comprises a negative lens component in the form of a cemented lens component having a negative refracting power, the negative lens component comprises, in order from the object side, a negative lens having a concave surface directed toward the image side and a positive lens having a convex surface directed toward the object side, the total number of lens component included in the first lens unit is one, and the second lens unit comprises a cemented lens component having at least one negative lens and a positive lens, where the term "lens component" refers to a lens member whose surfaces that are in contact with air on an optical axis include only two surfaces, one being an object side surface and the other being an image side surface.

According to another aspect of the present invention, there is provided a image pickup apparatus comprising:

a two-unit zoom lens as described above, and an image pickup element disposed on an image side of the two-unit zoom lens that converts an optical image formed by the two-unit zoom lens into an electrical signal.

BRIEF DESCRIPTION OF THE DRAWINGS

FIG. 1A shows the state at the wide angle end, FIG. 1B shows an intermediate state and FIG. 1C shows the state at the telephoto end;

FIG. 6A shows aberrations at the wide angle end, FIG. 6B shows aberrations in the intermediate state and FIG. 6C shows aberrations at the telephoto end.

DETAILED DESCRIPTION OF THE INVENTION

Figure 1A:
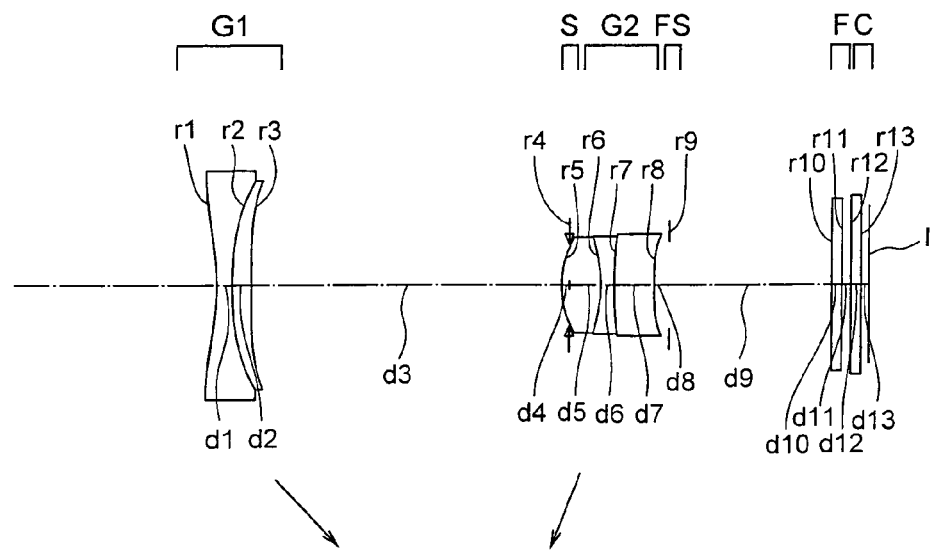
FIGS. 1A, 1B and 1C are cross sectional views taken along an optical axis showing the configuration of a first embodiment of the zoom lens according to the present invention in a state in which the zoom lens is focused on an object point at infinity, where

The basic configuration of the two-unit zoom lens according to the present invention is that the zoom lens includes, in order from the object side thereof, a first lens unit having a negative refracting power and a second lens unit having a positive refracting power, and the distance between the first lens unit and the second lens unit decreases during zooming from the wide angle end to the telephoto end.

As above, a lens unit having a negative refracting power is used as the lens unit closest to the object side, which is advantageous in reducing the diameter of the lens and in achieving a sufficiently wide angle of field at the wide angle end.

In addition, zooming is performed by changing the distance between the first lens unit having a negative refracting power and the second lens unit having a positive refracting power.

By designing each of the lens units in the above described two-unit zoom lens in the manner described below, size reduction, good optical performance and reduction of influence on decentering can be achieved more easily.

In the context of this specification, the term "lens component" refers to a lens member whose surfaces that are in contact with air on its optical axis include only two surfaces, one being the object side surface and the other being the image side surface. The first lens unit is designed to be a negative lens component in the form of a cemented lens having a negative refracting power including, in order from the object side, a negative lens having a concave surface directed toward the image side and a positive lens having a convex surface directed toward the object side.

By designing the first lens unit to be one negative lens component, in other word, by designing the first lens unit to include one lens component in total, it is made easy to make the thickness of the first lens unit small.

Furthermore, designing the negative lens component to include a negative lens having a concave surface directed toward the image side and a positive lens is advantageous in reducing spherical aberration and chromatic aberration generated in the first lens unit. In addition, decentering of lenses relative to one another can be easily reduced, and influence of decentering on off-axis aberrations can also be reduced.

Still further, designing the second lens unit to include a lens component in the form of a cemented lens including at least one negative lens and a positive lens is advantageous in reducing spherical aberration and chromatic aberration generated in the second lens unit. In addition, the degree of relative decentering between lenses included in the cemented lens component can be made small. Therefore, influence of decentering on off-axis aberrations can be easily reduced, and an improvement in throughput can be achieved.

Furthermore, it is more preferred that at least one of the following conditions be satisfied.

It is preferred that the second lens unit include at least one negative lens and a plurality of positive lenses, at least three of these negative and positive lenses be cemented to adjacent lenses, and the total number of the lens components included in the second lens unit be two or less.

With this configuration, the positive refracting power in the second lens unit is distributed to the plurality of positive lenses, and a negative lens is included in the second lens unit. This is advantageous in correcting spherical aberration and chromatic aberration.

In addition, cementing at least three lenses to adjacent lenses to have two or fewer lens components in the second lens unit is advantageous in further improving the performance of the second lens unit and in reducing its size.

It is preferred that the negative lens component in the first lens unit have an aspheric cemented surface. By designing the cemented surface in the first lens unit to be aspheric, it is made possible to excellently correct, primarily, chromatic aberration of magnification.

The negative lens component in the first lens unit may be designed to have a spherical cemented surface. By designing the cemented surface in the first lens unit to be spherical, it is possible to manufacture the lens unit at low cost.

It is preferred that the negative lens in the first lens unit has a biconcave shape that satisfies the following condition:

$$-0.95 < (r_{L11f} + r_{L11r})/(r_{L11f} - r_{L11r}) < 0.95 \quad (1)$$

where, $r_{L11f}$ is the paraxial radius of curvature of the object side surface of the negative lens in the first lens unit, and $r_{L11r}$ is the paraxial radius of curvature of the image side surface of the negative lens in the first lens unit.

Conditional expression (1) relates to the biconcave negative lens located closest to the object side in the first lens unit in the two-unit zoom lens.

By designing this lens in such a way that the lower limit of conditional expression (1) is not exceeded, concentration of the negative refracting power of the biconcave negative lens to its object side surface is mitigated, and it becomes easy to suppress generation of off-axis aberrations.

By designing this lens in such a way that the upper limit of conditional expression (1) is not exceeded, the curvature of the image side surface of the biconcave negative lens can be made small, whereby the positive lens in contact with the biconcave negative lens is prevented from having a meniscus shape with an extremely large curvature and it becomes easy to manufacture the lens.

Furthermore, it is preferred that the second lens unit satisfy the following condition:

$$1 \leq N_s \leq 3 \quad (2)$$

where $N_s$ is the total number of the cemented surfaces in the second lens unit.

Having one, two or three cemented surfaces in the second lens unit enables to provide a zoom lens having good optical performance at low cost.

Still further, it is preferred that all the lens components included in the second lens unit be cemented lenses. This facilitates reduction of influences of decentering. In addition, this is advantageous in reducing the size of the two-unit zoom lens when the lens barrel is collapsed.

Still further, it is preferred that the first lens unit satisfy the following condition:

$$0.05 < D_{G1}/f_w < 0.8 \quad (3)$$

where $D_{G1}$ is the thickness of the first lens unit on the optical axis, and $f_w$ is the focal length of the two-unit zoom lens at the wide angle end.

Conditional expression (3) describes preferred thickness of the first lens unit on the optical axis.

By designing the first lens unit in such a way that the lower limit of conditional expression (3) is not exceeded, it becomes easy to provide the positive lens with an adequate refracting power, which facilitates achievement of excellent optical performance.

Designing the first lens unit in such a way that the upper limit of conditional expression (3) is not exceeded is advantageous in reducing the thickness (i.e. the length along the optical axis) of the two-unit zoom lens when the lens barrel is collapsed.

Still further, it is preferred that the second lens unit satisfy the following condition:

$$0.1 < D_{G2}/f_w < 5.0 \quad (4)$$

where $D_{G2}$ is the thickness of the second lens unit on the optical axis, and $f_w$ is the focal length of the two-unit zoom lens at the wide angle end.

Conditional expression (4) describes preferred thickness of the second lens unit on the optical axis.

By designing the second lens unit in such a way that the lower limit of conditional expression (4) is not exceeded, it becomes easy to distribute the refracting power to each lens, which makes it easy to reduce, primarily, off-axis aberrations.

Designing the second lens unit in such a way that the upper limit of conditional expression (4) is not exceeded is advantageous in reducing the thickness of the two-unit zoom lens when the lens barrel is collapsed.

Still further, it is preferred that the cemented lens that has the largest focal length, in absolute value, among the cemented lenses in the second lens unit satisfy the following conditional expression:

$$0.5 < |f_{G2a}|/f_w < \infty \quad (5)$$

where $f_{G2a}$ is the focal length of the cemented lens that has the largest focal length, in absolute value, among the cemented lenses in the second lens unit, and $f_w$ is the focal length of the two-unit zoom lens at the wide angle end.

Conditional expression (5) relates to the refracting power of the second lens unit.

By designing the second lens unit in such a way that the lower limit of conditional expression (5) is not exceeded, the refracting power of the cemented lens is made moderately small, which makes it easy to suppress generation of on-axis and off-axis aberrations.

The upper limit of conditional expression (5) will never be exceeded.

Still further, it is preferred that the second lens unit satisfy the following condition:

$$3 \leq N_{G2} \leq 6 \quad (6)$$

where $N_{G2}$ is the total number of the lenses included in the second lens unit.

Having an adequate number of lenses in the second lens unit so that the lower limit of conditional expression (6) is not exceeded is advantageous in achieving a desired zooming ratio while maintaining satisfactory optical performance.

Designing the second lens unit in such a way that the upper limit of conditional expression (6) is not exceeded is preferred, since this makes it easy to reduce cost and to make the thickness of the two-unit zoom lens in at the time when the lens barrel is collapsed smaller.

Still further, it is preferred that the negative lens in the first lens unit satisfy the following condition:

$$nd_{G1L1} > 1.75 \quad (7)$$

where $nd_{G1L1}$ is the refractive index of the negative lens in the first lens unit.

If conditional expression (7) is satisfied, the lens located closest to the object side in the first lens unit can have a sufficient negative refracting power with a moderate curvature. This is advantageous in achieving size reduction and aberration correction.

Still further, it is preferred that the negative lens in the first lens unit satisfy the following condition:

$$vd_{G1L1} > 60 \quad (8)$$

where $vd_{G1L1}$ is the Abbe number of the negative lens in the first lens unit.

Satisfying conditional expression (8) is advantageous in correcting chromatic aberration of the first lens unit.

Still further, it is preferred that the aforementioned positive lens in the first lens unit have a shape that satisfies the following condition:

$$-40.0 < (r_{L12f} + r_{L12r})/(r_{L12f} - r_{L12r}) < -1.00 \quad (9)$$

where, $r_{L12f}$ is the paraxial radius of curvature of the object side surface of the positive lens in the first lens unit, and $r_{L12r}$ is the paraxial radius of curvature of the image side surface of the positive lens in the first lens unit.

Conditional expression (9) relates to the positive lens that is in contact with the negative lens in the first lens unit.

By designing this positive lens in such a way that the lower limit of conditional expression (9) is not exceeded, the curvature of the concave surface on the image side can be made moderately small, which makes it easy to suppress, primarily, generation of off-axis aberrations. In addition, in this case it is ensured that the positive lens has an adequate power, which is advantageous in ensuring a function of correction for chromatic aberration.

By designing the positive lens in the first lens unit as a lens having a meniscus shape while preventing the upper limit of conditional expression (9) from being exceeded, it becomes easy to provide the image side surface thereof with an adequate negative refracting power, which makes it easy to suppress, primarily, generation of on-axis aberrations.

It is preferred that the surface located closest to the object side in the second lens unit be an aspheric surface.

Designing the surface closest to the object side as an aspheric surface is advantageous in favorably correcting spherical aberration at all the zoom positions from the wide angle end to the telephoto end.

Still further, it is preferred that the second lens unit includes a lens component that has, in order from the object side, a positive lens, a negative lens and a positive lens.

Such a symmetrical refracting power arrangement of this lens component is advantageous in correcting spherical aberration and off-axis aberrations. By cementing the positive lens, negative lens and positive lens in the mentioned order, decentering of the lenses from one another can be made small, and the second lens unit can easily be designed to have an adequate refracting power. In addition, this lens configuration is advantageous in achieving a high zooming ratio.

Still further, it is preferred that the second lens unit be composed of a single lens component, namely the total number of the lens component included in the second lens unit be one. This is advantageous in making the size of the second lens unit small.

The second lens unit may be composed of two lens components each having a cemented surface. In other words, the total number of the lens components included in the second lens unit may be two.

By designing the second lens unit to be composed of two cemented lens components, chromatic aberration generated in each lens component can be made small. In addition, having four lens surfaces that are in contact with air is advantageous in controlling the principal points of the second lens unit and in reducing aberrations.

Still further, it is preferred that each lens component in the second lens unit be a doublet. This means that the total number of lenses included in the second unit is four, which is advantageous in reducing the cost.

Still further, it is preferred that during zooming from the wide angle end to the telephoto end, the second lens unit move in such a way as to satisfy the following condition:

$$0.5 < \Delta G2/f_w < 3.0 \quad (10)$$

where ΔG2 is the amount of displacement of the position of the second lens unit at the telephoto end from its position at the wide angle end, and displacements toward the object side are represented by positive values.

Conditional expression (10) describes appropriate amounts of displacement of the second lens unit that provide good balance (or compromise) between the size and aberrations.

By designing the lens configuration in such a way that the lower limit of conditional expression (10) is not exceeded, zooming function can be easily achieved even without making the refracting power of the second lens unit high. In addition, such design is advantageous in reducing variations in aberrations.

By designing the lens configuration in such a way that the upper limit of conditional expression (10) is not exceeded, the displacement amount of the second lens unit can be made moderately small, which is advantageous in reducing the entire length of the two-unit zoom lens.

An image pickup apparatus according to the present invention comprises a two-unit zoom lens and an image pickup element disposed on the image side of the two-unit zoom lens to convert an optical image formed by the two-unit zoom lens into an electrical signal, wherein said two-unit zoom lens is any one of the two-unit zoom lenses described in the foregoing. Thus, an image pickup apparatus equipped with a two-unit zoom lens that is compact in size and has good optical performance can be provided.

Furthermore, it is preferred that the image pickup apparatus have an image transformation section that transforms, by image processing, an electrical signal containing a distortion due to the two-unit zoom lens into an image signal in which the distortion is corrected.

By correcting a distortion electrically, requirements of aberration correction placed on the two-unit zoom lens can be mitigated. Thus, it becomes easy to provide the first lens unit with an adequate negative refracting power, which is advantageous in reducing the size of the two-unit zoom lens and in achieving a high zoom ratio.

In connection with this, distortion correction amounts may be varied among signals for different colors to correct chromatic aberration also by image processing.

It is more preferred that some of the above described features be applied in combination, from the viewpoint of achieving size reduction and higher performance etc.

In the case where the two-unit zoom lens has a focusing function, the conditional expressions presented above should be interpreted as conditions in the state in which the zoom lens is focused on the farthest object point.

It is more preferred that limit values in the above-mentioned conditional expressions be changed as follows.

As to conditional expression (1), it is more preferred that the lower limit value be −0.5, more preferably −0.3. It is more preferred that the upper limit value be 0.5, more preferably 0.3.

As to conditional expression (2), it is more preferred that the upper limit value be 2.

As to conditional expression (3), it is more preferred that the lower limit value be 0.1, more preferably 0.15. It is more preferred that the upper limit value be 0.6, more preferably 0.3.

As to conditional expression (4), it is more preferred that the lower limit value be 0.3, more preferably 0.5. It is more preferred that the upper limit value be 3.0, more preferably 2.5.

As to conditional expression (5), it is more preferred that the lower limit value be 0.8, more preferably 1.0. It is more preferred that the upper limit value of conventional expression (5) be 2000, 1000 or 200 to allow to configure the cemented lens to have a refracting power. This is advantageous in controlling the principal points etc.

As to conditional expression (6), it is more preferred that the upper limit value be 5, more preferably 4.

As to conditional expression (7), the upper limit value need not be set for the existing lens materials. However, it is preferred that the refractive index $nd_{G1L1}$ of the negative lens in the first lens unit do not exceed 20, since if the refractive index exceeds 20, severe surface accuracy control is required.

As to conditional expression (8), it is more preferred that the lower limit value be 65, more preferably 70. It is more preferred that an upper limit be additionally set to 95. This makes it easy to reduce influence of anomalous dispersion on secondary spectrum.

As to conditional expression (9), it is more preferred that the lower limit value be −20, more preferably −10. It is more preferred that the upper limit be −1.1, more preferably −1.2.

As to conditional expression (10), it is more preferred that the lower limit value be 0.7, more preferably 0.9, more preferably 1.0. It is more preferred that the upper limit be 2.0, more preferably 1.5, more preferably 1.3.

In the above-described modes of the invention, it is more preferred that some of the conditional expressions be satisfied simultaneously. In the numerical range limitations by each of the conditional expressions presented above, limitation by only the upper limit value or the lower limit value may be applied. Furthermore, the various features described above may be adopted in any possible combination.

In the following, embodiments of the zoom lens and the image pickup apparatus according to the present invention will be described in detail with reference to the accompanying drawings. It should be understood, however, that the embodiments described below are not intended to limit the present invention.

In the following, first to fifth embodiments of the zoom lens according to the present invention will be described. FIGS. 1A to 1C, 2A to 2C, 3A to 3C, 4A to 4C and 5A to 5C are cross sectional views showing the configuration of the zoom lenses according to the first to fifth embodiments respectively at the wide angle end (FIGS. 1A, 2A, 3A, 4A and 5A), at an intermediate focal length position (FIGS. 1B, 2B, 3B, 4B and 5B) and at the telephoto end (FIGS. 1C, 2C, 3C, 4C and 5C) in the state in which the zoom lens is focused on an object-point at infinity. In FIGS. 1A through 5C, the first lens unit is denoted by G1, an iris stop (or aperture stop) is denoted by S, the second lens unit is denoted by G2, a flare stop is denoted by FS, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

All the numerical data presented below are for the state in which the zoom lens is focused on an object at infinity. In the numerical data, dimensions are in mm and angles are in degrees. The zoom data are presented for the wide angle end (WE), intermediate zoom state (ST) and telephoto end (TE).

Each of the zoom lenses according to the embodiments is a two-unit zoom lens of a negative-positive configuration having a zoom ratio of 3 or so while achieving good optical performance.

In the zoom lenses according to the embodiments, the effective image pickup area has a rectangular shape constantly at all zoom positions.

Values associated with conditional expressions presented below for each embodiment are for the state in which the zoom lens is focused on an object point at infinity. The total length refers to the sum of the distance between the incident surface and the exit surface of the lens on the optical axis and the back focus. The back focus is represented by an equivalent air distance.

During zooming from the wide angle end to the telephoto end, the first lens unit first moves toward the image side and then toward the object side, and the second lens unit moves only toward the object side.

Focusing is performed by moving the first lens unit along the optical axis direction. Specifically, upon focusing operation from an object at a long distance to an object at a short distance, the first lens unit is moved toward the object side.

The plane parallel plates include a low pass filter having IR cut coating and a CCD cover glass.

Figure 1B:
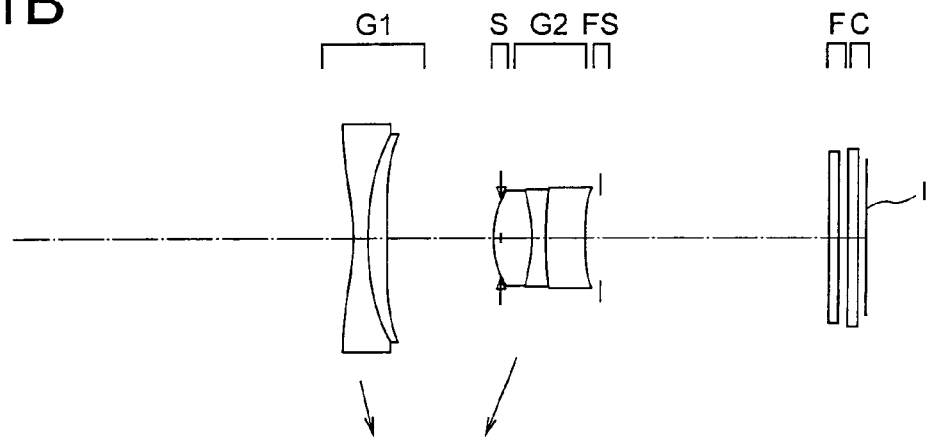
Figure 1C:
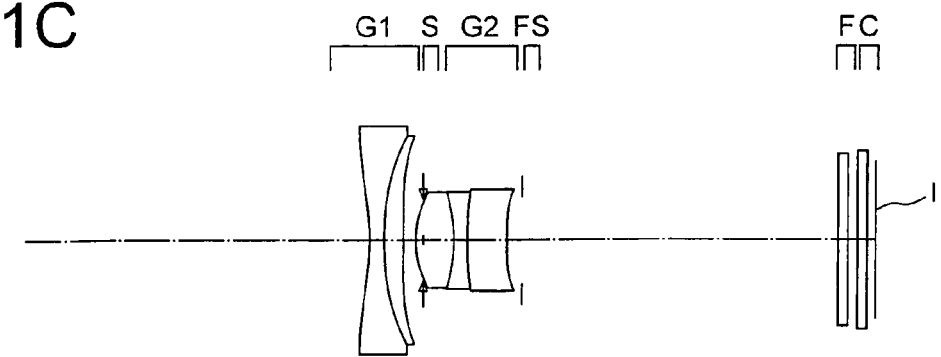

As shown in FIGS. 1A, 1B and 1C, the zoom lens according to the first embodiment has a first lens unit G1 having a negative refracting power, an iris stop S, a second lens unit G2 having a positive refracting power and a flare stop FS, which are arranged in the mentioned order from the object side.

During zooming from the wide angle end to the telephoto end, the first lens unit G1 moves first toward the image side and then to the object side, and the second lens unit G2 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a biconvex positive lens, a biconcave negative lens and a positive meniscus lens having a convex surface directed toward the object side.

Aspheric surfaces are used in the object side surface of the biconcave negative lens in the first lens unit G1, the image side surface of the positive meniscus lens having a convex surface directed toward the object side in the first lens unit G1, the object side surface of the biconvex positive lens in the second lens unit G2 and the image side surface of the positive meniscus lens having a convex surface directed toward the object side in the second lens unit G2, namely there are four aspherical surfaces in total.

Figure 2A:
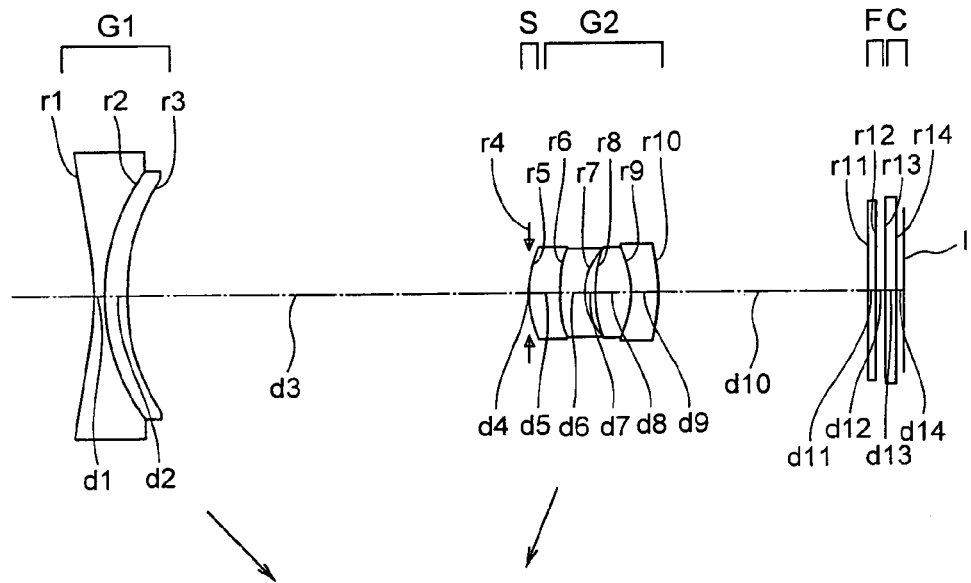
FIGS. 2A, 2B and 2C are cross sectional views similar to FIGS. 1A, 1B and 1C respectively, showing the configuration of a second embodiment of the zoom lens according to the present invention.
Figure 2B:
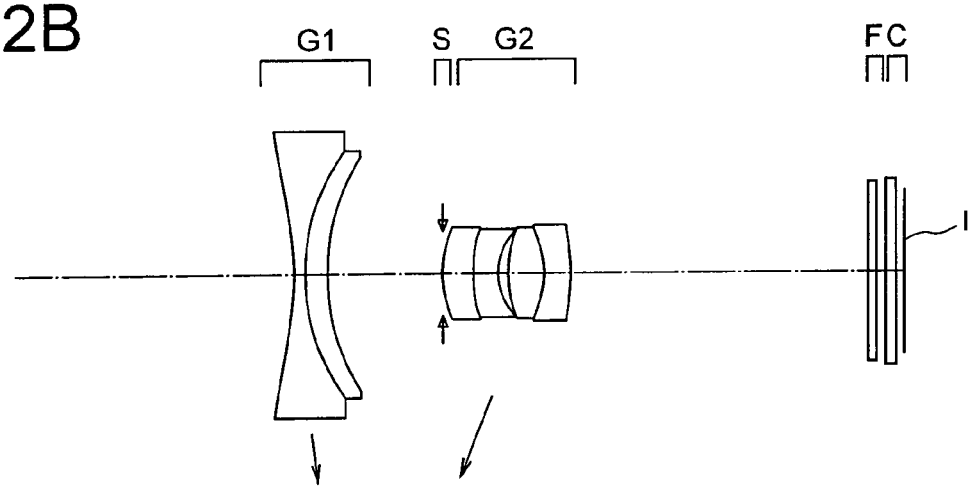
Figure 2C:
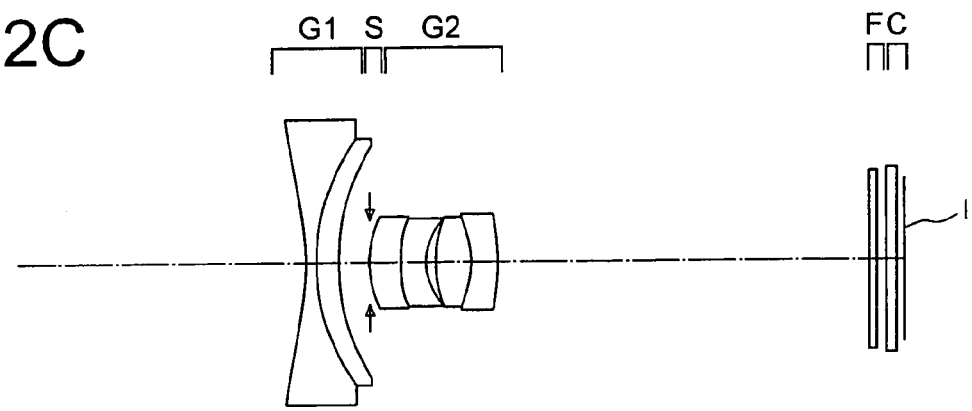

As shown in FIGS. 2A, 2B and 2C, the zoom lens according to the second embodiment has a first lens unit G1 having a negative refracting power, an iris stop S and a second lens unit G2 having a positive refracting power, which are arranged in the mentioned order from the object side.

During zooming from the wide angle end to the telephoto end, the first lens unit G1 moves first toward the image side and then to the object side, and the second lens unit G2 moves only toward the object side.

The first lens unit G1 includes a cemented lens composed, in order from the object side, of a biconcave negative lens and a positive meniscus lens having a convex surface directed toward the object side. The second lens unit G2 includes, in order from the object side, a cemented lens composed of a positive meniscus lens having a convex surface directed toward the object side and a negative meniscus lens having a convex surface directed toward the object side and a cemented lens composed of a biconvex positive lens and a negative meniscus lens having a convex surface directed toward the image side.

Aspheric surfaces are used in the object side surface of the biconcave negative lens in the first lens unit G1, the image side surface of the positive meniscus lens having a convex surface directed toward the object side in the first lens unit G1, the object side surface of the positive meniscus lens having a convex surface directed toward the object side that is located closest to the object side in the second lens unit G2, the image side surface of the negative meniscus lens having a convex surface directed toward the object side in the second lens unit G2 and the image side surface of the negative meniscus lens having a convex surface directed toward the image side that is located closest to the image side in the second lens unit G2, namely there are five aspherical surfaces in total.

Figure 3A:
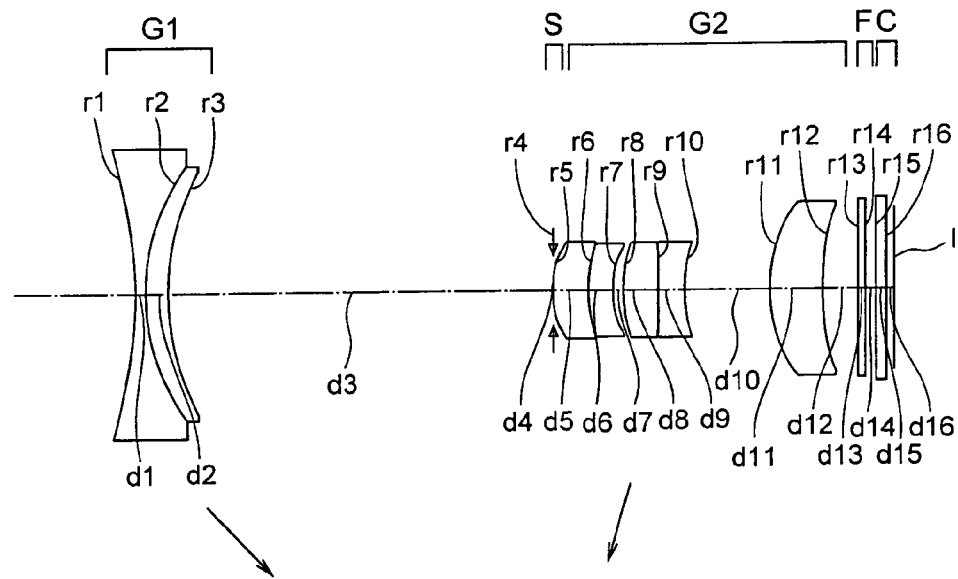
FIGS. 3A, 3B and 3C are cross sectional views similar to FIGS. 1A, 1B and 1C respectively, showing the configuration of a third embodiment of the zoom lens according to the present invention.
Figure 3B:
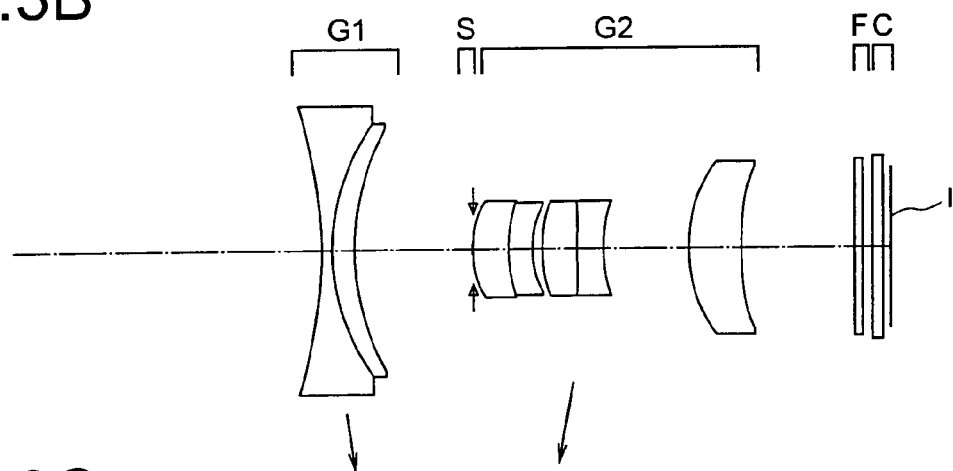
Figure 3C:
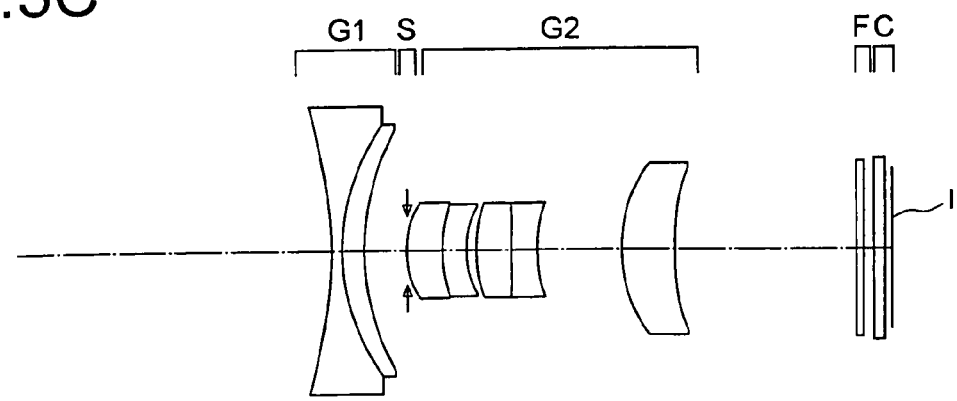

As shown in FIGS. 3A, 3B and 3C, the zoom lens according to the third embodiment has a first lens unit G1 having a negative refracting power, an iris stop S and a second lens unit G2 having a positive refracting power, which are arranged in the mentioned order from the object side.

During zooming from the wide angle end to the telephoto end, the first lens unit G1 moves first toward the image side and then to the object side, and the second lens unit G2 moves only toward the object side.

The first lens unit G1 includes a cemented lens composed, in order from the object side, of a biconcave negative lens and a positive meniscus lens having a convex surface directed toward the object side. The second lens unit G2 includes, in order from the object side, a cemented lens composed of a positive meniscus lens having a convex surface directed toward the object side and a negative meniscus lens having a convex surface directed toward the object side, a cemented lens composed of a positive meniscus lens having a convex surface directed toward the object side and a negative meniscus lens having a convex surface directed toward the object side and a positive meniscus lens having a convex surface directed toward the object side.

Aspheric surfaces are used in the object side surface of the biconcave negative lens in the first lens unit G1, the image side surface of the positive meniscus lens having a convex surface directed toward the object side in the first lens unit G1, the object side surface of the positive meniscus lens having a convex surface directed toward the object side that is located closest to the object side in the second lens unit, the image side surface of the negative meniscus lens having a convex surface directed toward the object side in the second lens unit G2 and the image side surface of the negative meniscus lens having a convex surface directed toward the object side that is located closest to the image side in the second lens unit G2, namely there are five aspherical surfaces in total.

Figure 4A:
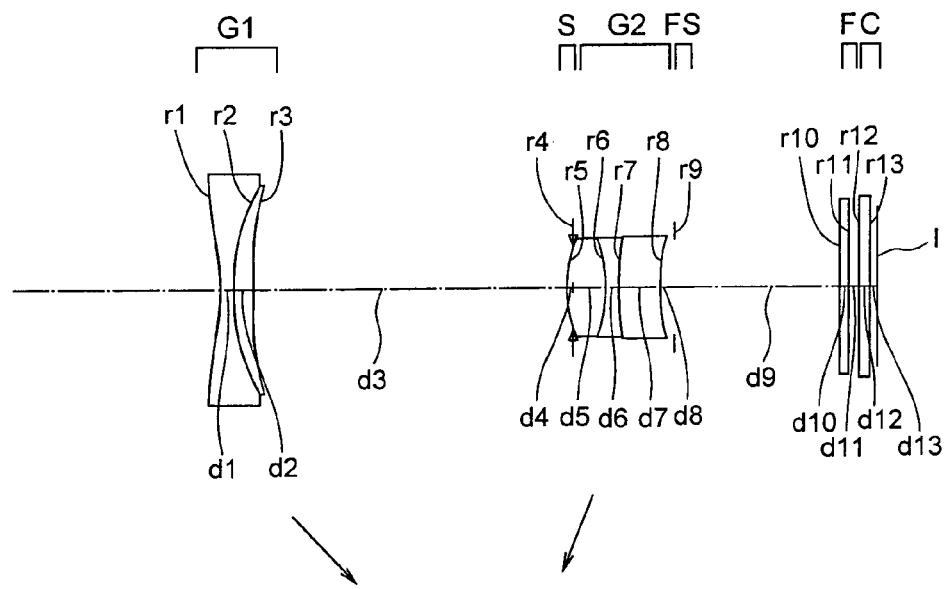
FIGS. 4A, 4B and 4C are cross sectional views similar to FIGS. 1A, 1B and 1C respectively, showing the configuration of a fourth embodiment of the zoom lens according to the present invention.
Figure 4B:
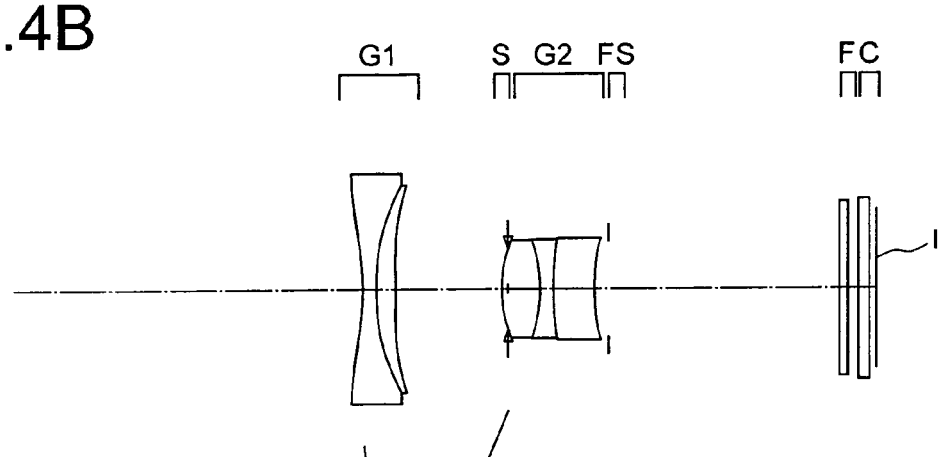
Figure 4C:
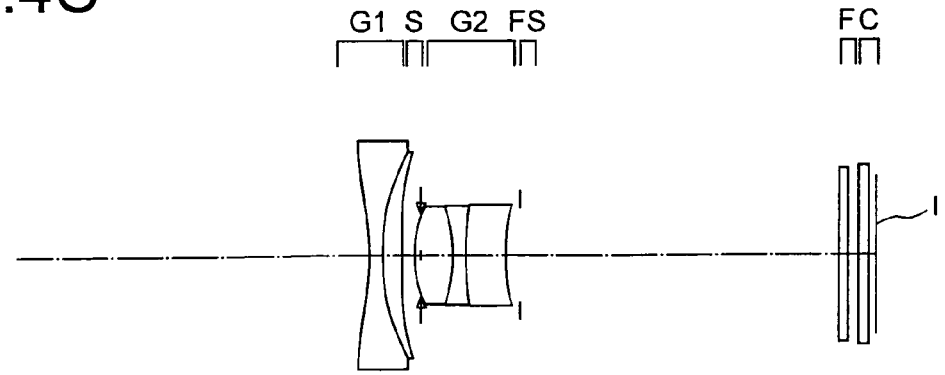

As shown in FIGS. 4A, 4B and 4C, the zoom lens according to the fourth embodiment has a first lens unit G1 having a negative refracting power, an iris stop S, a second lens unit G2 having a positive refracting power and a flare stop FS, which are arranged in the mentioned order from the object side.

During zooming from the wide angle end to the telephoto end, the first lens unit G1 moves first toward the image side and then to the object side, and the second lens unit G2 moves only toward the object side.

The first lens unit G1 includes a cemented lens composed, in order from the object side, of a biconcave negative lens and a positive meniscus lens having a convex surface directed toward the object side. The second lens unit G2 includes a cemented lens composed, in order from the object side, of a biconvex positive lens, a biconcave negative lens and a positive meniscus lens having a convex surface directed toward the object side.

Aspheric surfaces are used in both surfaces of the biconcave negative lens in the first lens unit G1, the image side surface of the positive meniscus lens having a convex surface directed toward the object side in the first lens unit G1, the object side surface of the biconvex positive lens in the second lens unit G2 and the image side surface of the positive meniscus lens having a convex surface directed toward the object side, namely there are five aspherical surfaces in total.

Figure 5A:
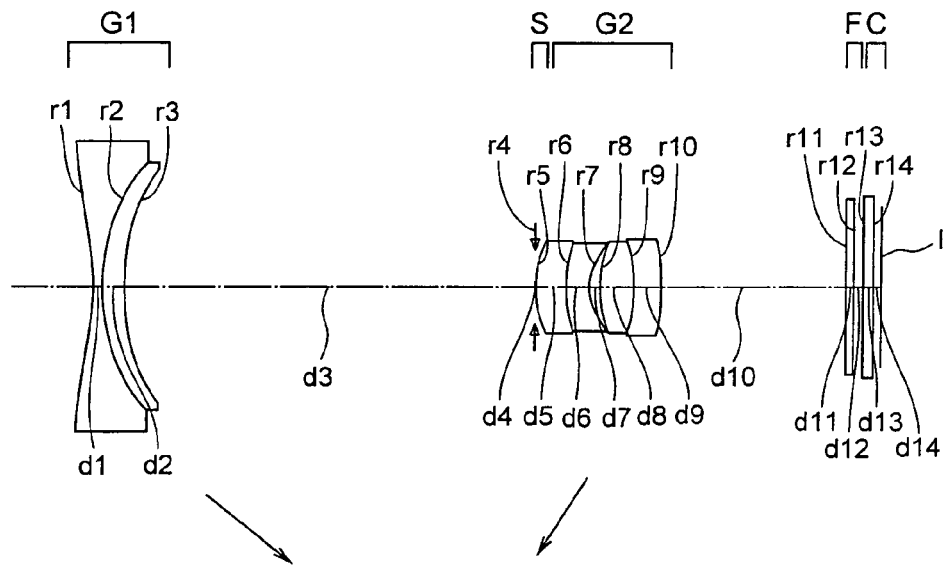
FIGS. 5A, 5B and 5C are cross sectional views similar to FIGS. 1A, 1B and 1C respectively, showing the configuration of a fifth embodiment of the zoom lens according to the present invention.
Figure 5B:
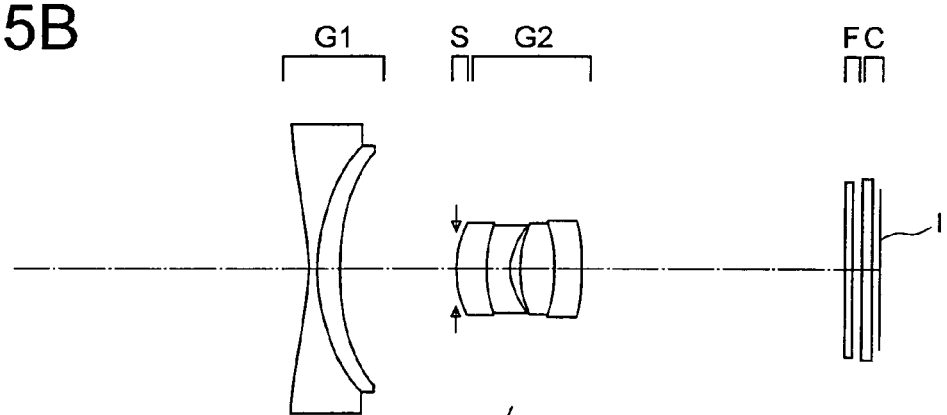
Figure 5C:
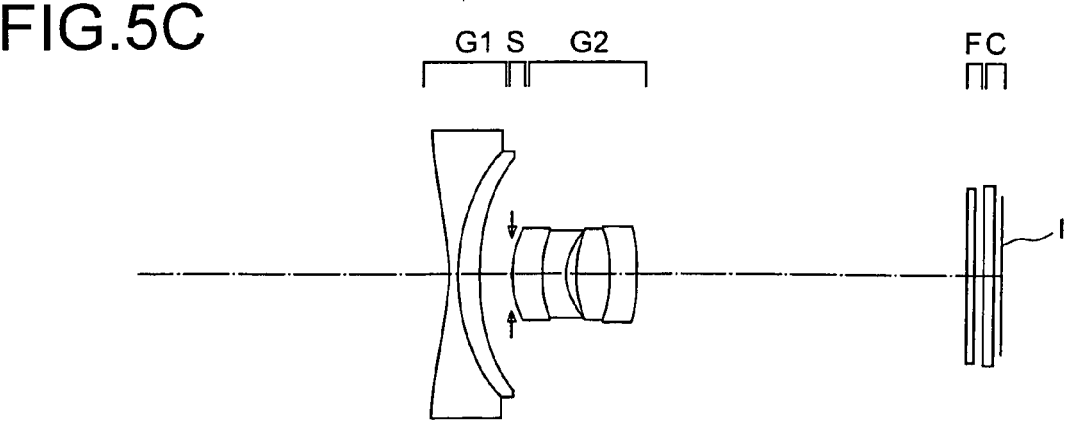
Figure 6A:
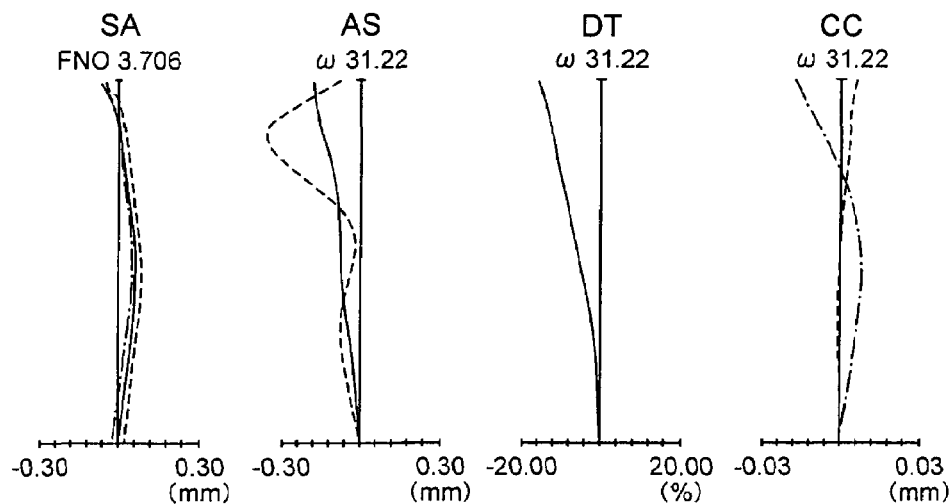
FIGS. 6A, 6B and 6C are diagrams showing spherical aberration, astigmatism, distortion and chromatic aberration of magnification in the zoom lens according to the first embodiment in a state in which the zoom lens is focused on an object point at infinity, where
Figure 6B:
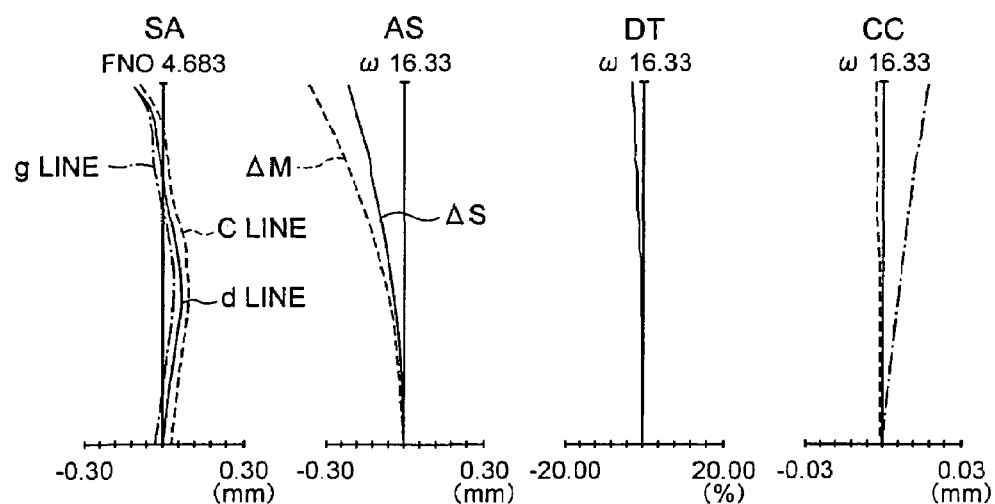
Figure 6C:
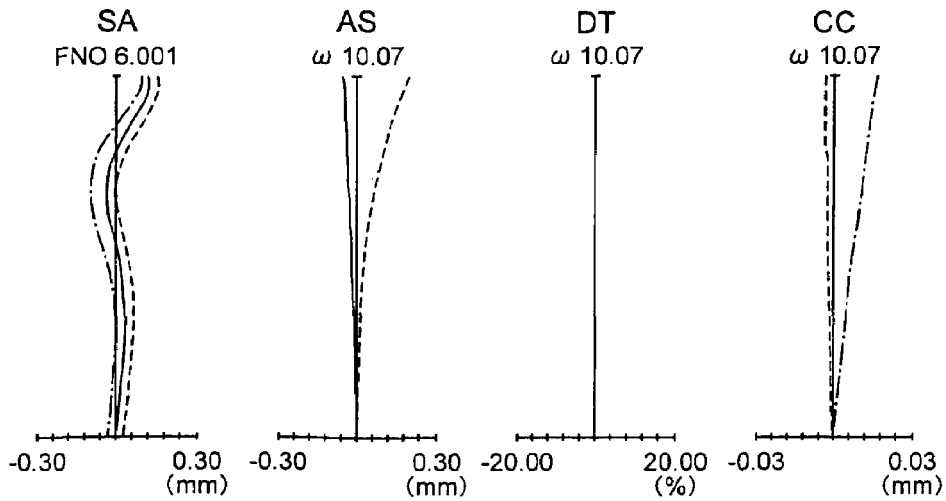
Figure 7A:
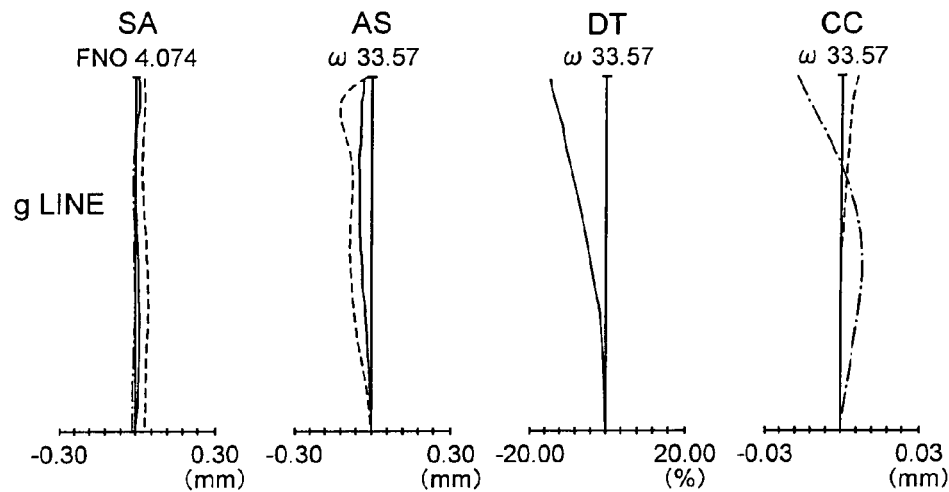
FIGS. 7A, 7B and 7C are diagrams similar to FIGS. 6A, 6B and 6C showing aberrations in the zoom lens according to the second embodiment in a state in which the zoom lens is focused on an object point at infinity.
Figure 7B:
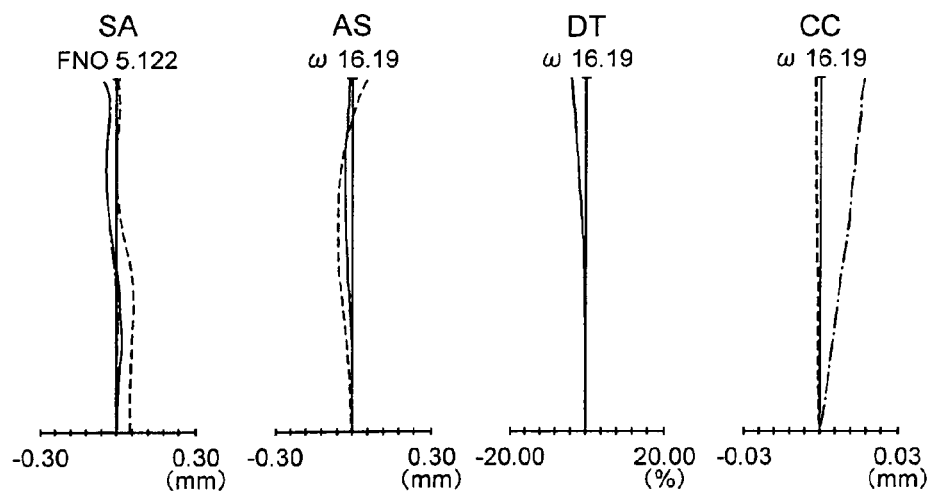
Figure 7C:
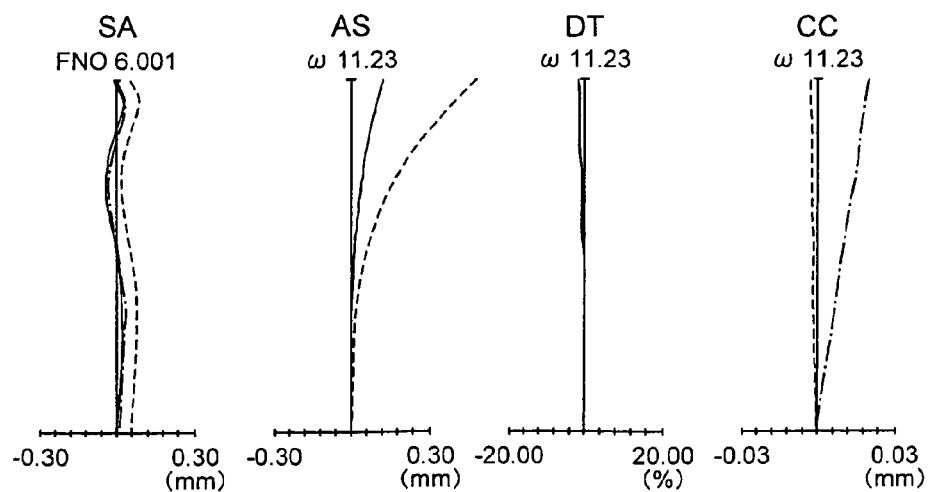
Figure 8A:
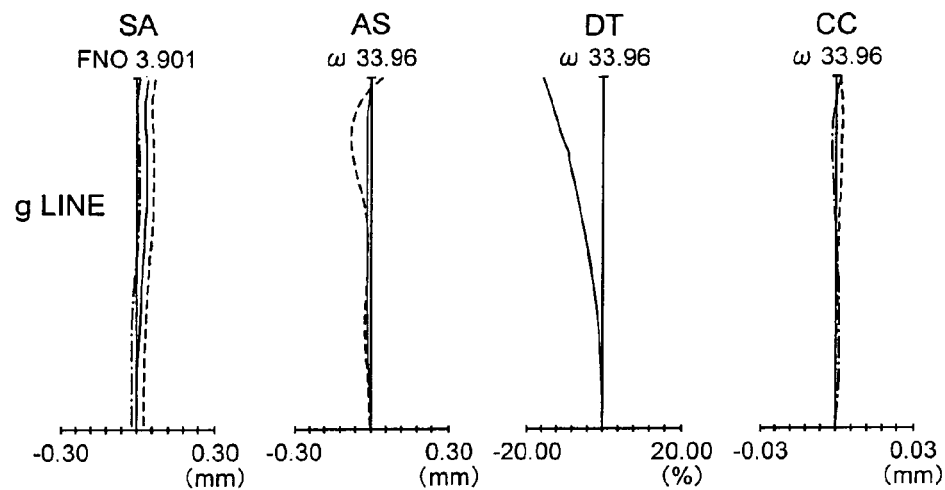
FIGS. 8A, 8B and 8C are diagrams similar to FIGS. 6A, 6B and 6C showing aberrations in the zoom lens according to the third embodiment in a state in which the zoom lens is focused on an object point at infinity.
Figure 8B:
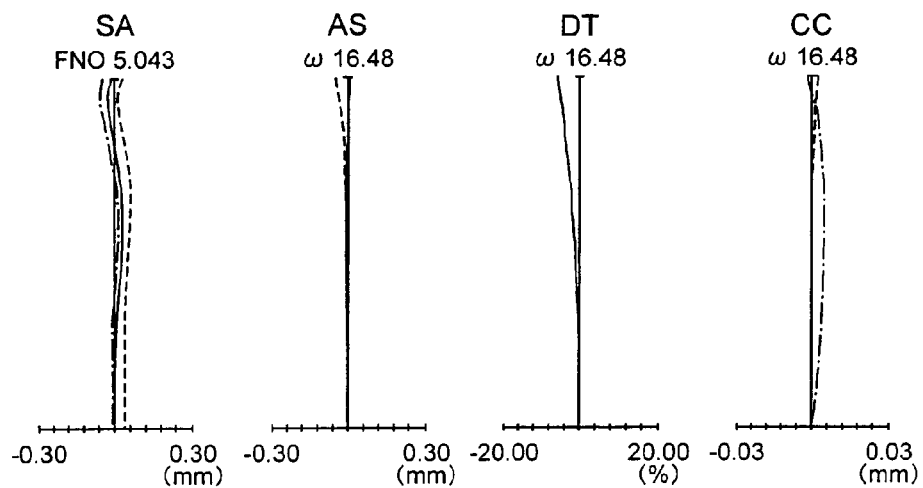
Figure 8C:
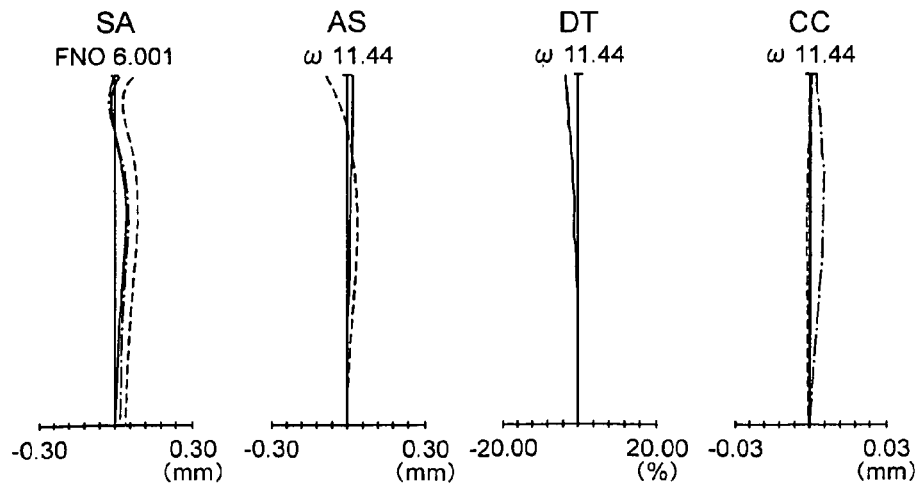
Figure 9A:
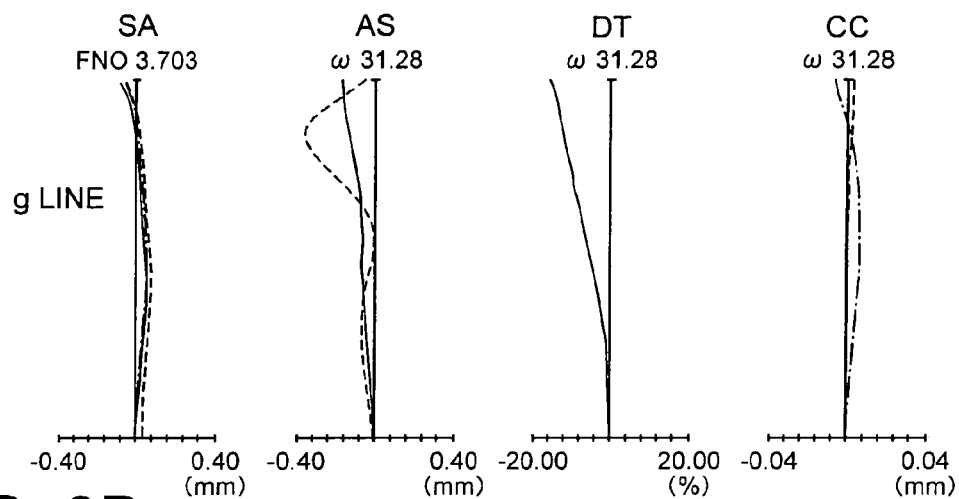
FIGS. 9A, 9B and 9C are diagrams similar to FIGS. 6A, 6B and 6C showing aberrations in the zoom lens according to the fourth embodiment in a state in which the zoom lens is focused on an object point at infinity.
Figure 9B:
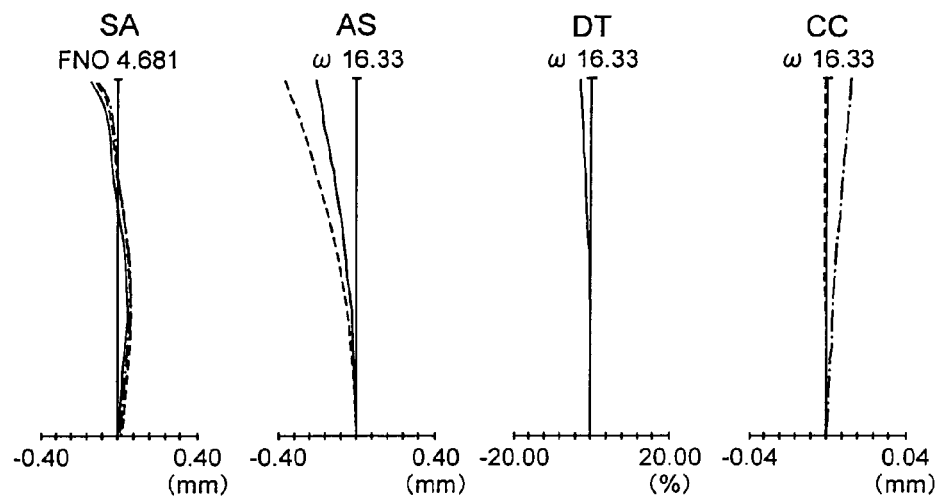
Figure 9C:
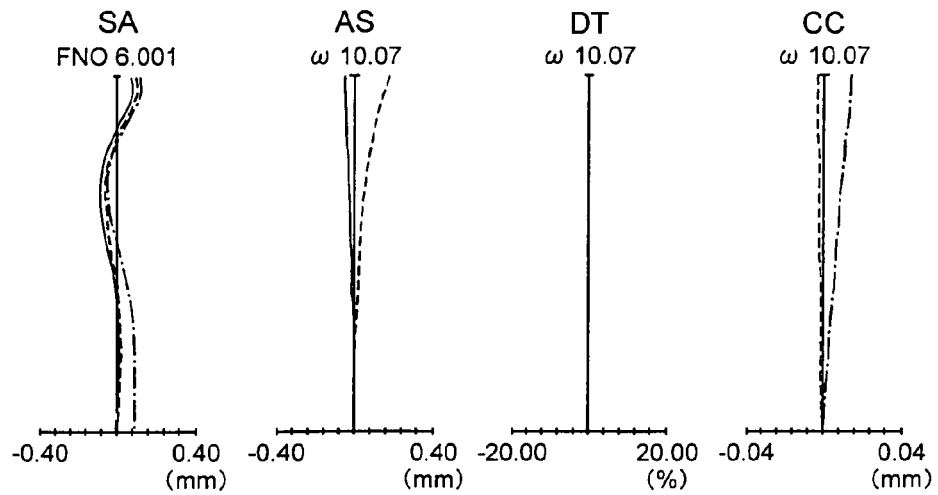
Figure 10A:
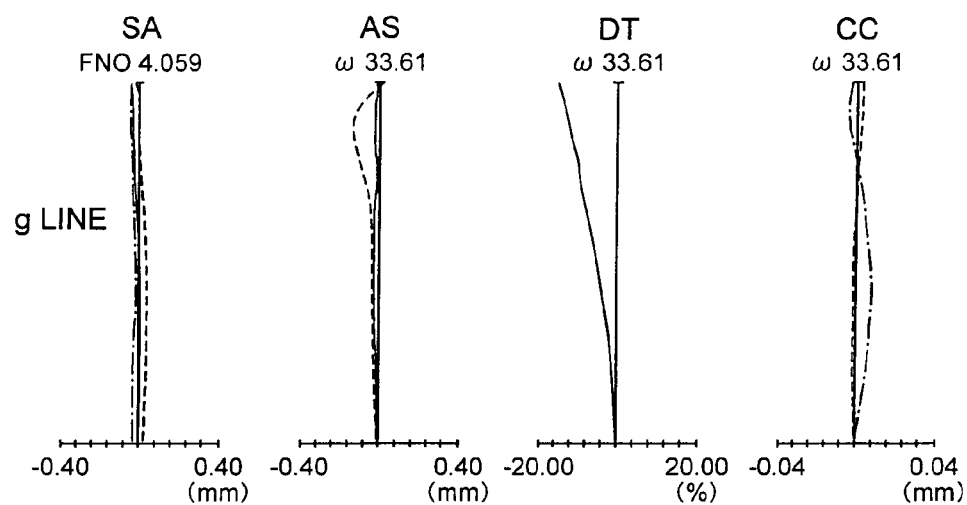
FIGS. 10A, 10B and 10C are diagrams similar to FIGS. 6A, 6B and 6C showing aberrations in the zoom lens according to the fifth embodiment in a state in which the zoom lens is focused on an object point at infinity.
Figure 10B:
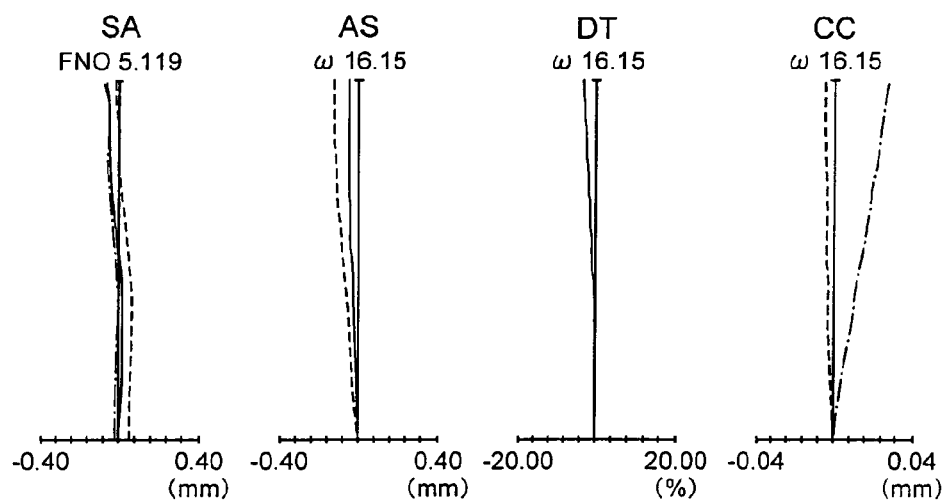
Figure 10C:
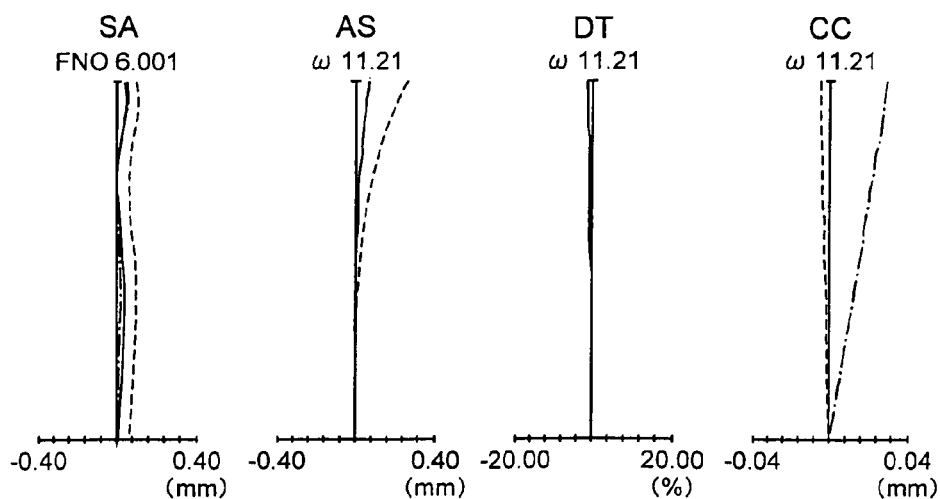

As shown in FIGS. 5A, 5B and 5C, the zoom lens according to the fifth embodiment has a first lens unit G1 having a negative refracting power, an iris stop S and a second lens unit G2 having a positive refracting power, which are arrange in the mentioned order from the object side.

During zooming from the wide angle end to the telephoto end, the first lens unit G1 moves first toward the image side and then to the object side, and the second lens unit G2 moves only toward the object side.

The first lens unit G1 includes a cemented lens composed, in order from the object side, of a biconcave negative lens and a positive meniscus lens having a convex surface directed toward the object side. The second lens unit G2 includes, in order from the object side, a cemented lens composed of a positive meniscus lens having a convex surface directed toward the object side and a negative meniscus lens having a convex surface directed toward the object side and a cemented lens composed of a biconvex positive lens and a negative meniscus lens having a convex surface directed toward the image side.

Aspheric surfaces are used in both surfaces of the biconcave negative lens in the first lens unit G1, the image side surface of the positive meniscus lens having a convex surface directed toward the object side in the first lens unit G1, the object side surface of the positive meniscus lens having a convex surface directed toward the object side that is located closest to the object side in the second lens unit G2, the image side surface of the negative meniscus lens having a convex surface directed toward the object side in the second lens unit G2 and the image side surface of the negative meniscus lens having a convex surface directed toward the image side that is located closest to the image side in the second lens unit G2, namely there are six aspherical surfaces in total.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively.

Moreover, in the aspherical surface coefficients, 'e-n' (where, n is an integral number) indicates '$10^{-n}$'.

Further "A" means that the surface is an aspheric surface, and "S" means that the surface is an aperture stop, "FS" means that the surface is a flare stop.

| Example 1 unit mm | | | | |
|---|---|---|---|---|
| Surface data | | | | |
| Surface No | r | d | nd | vd |
| 1* | −18.595 | 0.70 | 1.75500 | 52.32 |
| 2 | 13.016 | 1.03 | 1.63494 | 23.22 |
| 3* | 100.000 | Variable | | |
| 4 (S) | ∞ | −0.40 | | |
| 5* | 6.133 | 2.00 | 1.80610 | 40.73 |
| 6 | −8.787 | 0.70 | 1.84666 | 23.78 |
| 7 | 18.518 | 2.10 | 1.49700 | 81.54 |
| 8* | 25.852 | 0.74 | | |
| 9 (FS) | ∞ | Variable | | |
| 10 | ∞ | 0.50 | 1.51633 | 64.14 |
| 11 | ∞ | 0.50 | | |
| 12 | ∞ | 0.50 | 1.51633 | 64.14 |
| 13 | ∞ | 0.42 | | |
| Image plane (Light receiving surface) | | | | |

Aspherical coefficients

1st surface k = 0.000, A4 = −6.30733e−04,
A6 = 8.04700e−05, A8 = −2.41468e−06, A10 = 2.49221e−08

3nd surface k = 0.000, A4 = −9.01978e−04,
A6 = 1.35944e−04, A8 = −4.48134e−06, A10 = 5.17594e−08

5nd surface k = −7.388, A4 = 3.77081e−03,
A6 = −6.67603e−05, A8 = −2.24170e−05, A10 = 2.92987e−06

8nd surface k = −100.000, A4 = 2.87287e−03,
A6 = 3.90010e−04, A8 = −9.58675e−05, A10 = 1.09405e−05

| Group focal length | |
|---|---|
| f1 = −17.66 | f2 = 10.02 |

| Zoom data | | | |
|---|---|---|---|
| | WE | ST | TE |
| IH | 3.84 | 3.84 | 3.84 |
| focal length | 7.51 | 13.50 | 21.62 |
| Fno. | 3.71 | 4.68 | 6.00 |
| 2ω (°) | 62.44 | 32.66 | 20.13 |
| BF | 10.76 | 14.16 | 18.77 |
| Total length | 33.27 | 26.21 | 25.89 |
| d3 | 16.38 | 5.92 | 1.00 |
| d9 | 8.43 | 11.84 | 16.45 |

| Example 2 unit mm | | | | |
|---|---|---|---|---|
| Surface data | | | | |
| Surface No | r | d | nd | vd |
| 1* | −14.506 | 0.50 | 1.49700 | 81.54 |
| 2 | 10.856 | 1.15 | 1.84666 | 23.78 |
| 3* | 15.277 | Variable | | |
| 4 (S) | ∞ | −0.04 | | |
| 5* | 5.072 | 1.60 | 1.72916 | 54.68 |
| 6 | 7.779 | 1.20 | 1.49700 | 81.54 |

-continued

| | | | | |
|---|---|---|---|---|
| 7* | 2.734 | 0.50 | | |
| 8 | 6.852 | 1.75 | 1.72916 | 54.68 |
| 9 | −6.086 | 1.35 | 1.94595 | 17.98 |
| 10* | −11.713 | Variable | | |
| 11 | ∞ | 0.40 | 1.54771 | 62.84 |
| 12 | ∞ | 0.50 | | |
| 13 | ∞ | 0.50 | 1.51633 | 64.14 |
| 14 | ∞ | 0.40 | | |
| Image plane | | | | |
| (Light receiving surface) | | | | |

Aspherical coefficients

1st surface k = 0.000, A4 = 5.89517e−04,
A6 = −7.97026e−06, A8 = 1.07863e−07, A10 = −7.51442e−10
3rd surface k = 0.000, A4 = 3.11742e−04
5th surface k = 0.000, A4 = −1.00466e−03,
A6 = −2.32696e−04, A8 = 3.58215e−05, A10 = −2.14951e−06
7th surface k = 0.000, A4 = −4.49538e−03,
A6 = −2.06695e−03, A8 = 4.98497e−04, A10 = −6.83344e−05
10th surface k = 0.000, A4 = −5.81625e−04,
A6 = 8.83885e−05, A8 = −1.84184e−05

Group focal length

| f1 = −17.30 | f2 = 10.93 |
|---|---|

Zoom data

| | WE | ST | TE |
|---|---|---|---|
| IH | 3.84 | 3.84 | 3.84 |
| focal length | 6.80 | 13.73 | 19.60 |
| Fno. | 4.07 | 5.12 | 6.00 |
| 2ω (°) | 67.14 | 32.38 | 22.46 |
| BF | 11.93 | 16.31 | 20.01 |
| Total length | 39.69 | 30.03 | 29.61 |
| d3 | 19.76 | 5.72 | 1.59 |
| d10 | 10.44 | 14.82 | 18.53 |

Example 3
unit mm

Surface data

| Surface No | r | d | nd | vd |
|---|---|---|---|---|
| 1* | −17.815 | 0.50 | 1.49700 | 81.54 |
| 2 | 10.941 | 1.15 | 1.84666 | 23.78 |
| 3* | 13.902 | Variable | | |
| 4 (S) | ∞ | −0.04 | | |
| 5* | 4.551 | 1.83 | 1.72916 | 54.68 |
| 6 | 8.057 | 1.20 | 1.49700 | 81.54 |
| 7* | 5.646 | 0.50 | | |
| 8 | 7.883 | 1.75 | 1.72916 | 54.68 |
| 9 | 1190.884 | 1.35 | 1.94595 | 17.98 |
| 10* | 8.753 | 4.29 | | |
| 11 | 8.000 | 2.63 | 1.75520 | 27.51 |
| 12 | 13.916 | Variable | | |
| 13 | ∞ | 0.40 | 1.54771 | 62.84 |
| 14 | ∞ | 0.50 | | |
| 15 | ∞ | 0.50 | 1.51633 | 64.14 |
| 16 | ∞ | 0.39 | | |
| Image plane | | | | |
| (Light receiving surface) | | | | |

Aspherical coefficients

1st surface k = 0.000, A4 = 2.93453e−04,
A6 = −2.64599e−06, A8 = −2.24119e−08, A10 = 2.97856e−10
3rd surface k = 0.000, A4 = 1.13735e−04,
A6 = 4.24332e−06, A8 = −2.79169e−07, A10 = 2.92069e−09
5th surface k = 0.000, A4 = 9.14199e−05, A6 = −1.31362e−04,
A8 = 3.90582e−05, A10 = −4.14670e−06
7th surface k = 0.000, A4 = 2.88368e−03,
A6 = −4.44459e−04, A8 = 1.92375e−04, A10 = −2.13182e−05
10th surface k = 0.000, A4 = 1.06607e−03,
A6 = 3.48197e−05, A8 = 6.44665e−06

Group focal length

| f1 = −17.56 | f2 = 10.18 |
|---|---|

Zoom data

| | WE | ST | TE |
|---|---|---|---|
| IH | 3.84 | 3.84 | 3.84 |
| focal length | 6.80 | 13.74 | 19.60 |
| Fno. | 3.90 | 5.04 | 6.00 |
| 2ω (°) | 67.91 | 32.97 | 22.89 |
| BF | 3.28 | 7.31 | 10.70 |
| Total length | 32.76 | 26.53 | 26.45 |
| d3 | 19.25 | 5.97 | 2.08 |
| d12 | 1.80 | 5.82 | 9.23 |

Example 4
unit mm

Surface data

| Surface No | r | d | nd | vd |
|---|---|---|---|---|
| 1* | −18.680 | 0.70 | 1.75500 | 52.32 |
| 2* | 15.104 | 1.00 | 1.63494 | 23.22 |
| 3* | 82.143 | Variable | | |
| 4 (S) | ∞ | −0.40 | | |
| 5* | 6.141 | 2.00 | 1.80610 | 40.73 |
| 6 | −7.921 | 0.70 | 1.84666 | 23.78 |
| 7 | 22.631 | 2.10 | 1.49700 | 81.54 |
| 8* | 22.470 | 0.74 | | |
| 9 (FS) | ∞ | Variable | | |
| 10 | ∞ | 0.50 | 1.51633 | 64.14 |
| 11 | ∞ | 0.50 | | |
| 12 | ∞ | 0.50 | 1.51633 | 64.14 |
| 13 | ∞ | 0.42 | | |
| Image plane | | | | |
| (Light receiving surface) | | | | |

Aspherical coefficients

1st surface k = 0.000, A4 = −6.20263e−04,
A6 = 8.15585e−05, A8 = −2.45369e−06, A10 = 2.50750e−08
2nd surface k = 0.000, A4 = 3.00523e−04,
A6 = 2.75079e−05, A8 = −9.01268e−07
3rd surface k = 0.000, A4 = −9.50787e−04,
A6 = 1.34775e−04, A8 = −4.43015e−06, A10 = 5.17908e−08

-continued

5th surface k = −7.363, A4 = 3.76149e−03,
A6 = −6.88591e−05, A8 = −2.20188e−05, A10 = 2.94730e−06

8th surface k = −100.000, A4 = 3.18713e−03,
A6 = 3.99294e−04, A8 = −1.02805e−04, A10 = 1.15388e−05

Group focal length

| f1 = −17.67 | f2 = 9.99 |
|---|---|

Zoom data

|  | WE | ST | TE |
|---|---|---|---|
| IH | 3.84 | 3.84 | 3.84 |
| focal length | 7.51 | 13.50 | 21.62 |
| Fno. | 3.70 | 4.68 | 6.00 |
| 2ω (°) | 62.57 | 32.66 | 20.13 |
| BF | 10.69 | 14.08 | 18.66 |
| Total length | 33.14 | 26.09 | 25.76 |
| d3 | 16.35 | 5.91 | 1.00 |
| d9 | 8.37 | 11.76 | 16.35 |

Example 5
unit mm

Surface data

| Surface No | r | d | nd | vd |
|---|---|---|---|---|
| 1* | −14.031 | 0.50 | 1.49700 | 81.54 |
| 2* | 11.216 | 1.15 | 1.84666 | 23.78 |
| 3* | 17.084 | Variable | | |
| 4 (S) | ∞ | −0.04 | | |
| 5* | 4.769 | 1.60 | 1.72916 | 54.68 |
| 6 | 7.779 | 1.20 | 1.49700 | 81.54 |
| 7* | 2.631 | 0.50 | | |
| 8 | 5.876 | 1.75 | 1.72916 | 54.68 |
| 9 | −7.129 | 1.35 | 1.94595 | 17.98 |
| 10* | −17.837 | Variable | | |
| 11 | ∞ | 0.40 | 1.54771 | 62.84 |
| 12 | ∞ | 0.50 | | |
| 13 | ∞ | 0.50 | 1.51633 | 64.14 |
| 14 | ∞ | 0.40 | | |
| Image plane (Light receiving surface) | | | | |

Aspherical coefficients

1st surface k = 0.000, A4 = 7.11373e−04,
A6 = −8.06190e−06, A8 = 8.20716e−08, A10 = −5.91372e−10

2nd surface k = 1.699, A4 = −1.00477e−04,
A6 = −3.22516e−06, A8 = 1.27304e−08, A10 = −6.84920e−10

3rd surface k = 0.000, A4 = 4.52048e−04

5th surface k = 0.000, A4 = −8.71210e−04,
A6 = −2.03520e−04, A8 = 3.98750e−05, A10 = −3.56969e−06

7th surface k = 0.000, A4 = −4.34340e−03,
A6 = −2.00310e−03, A8 = 5.09009e−04, A10 = −8.25084e−05

10th surface k = 0.000, A4 = −4.99676e−04,
A6 = 8.47866e−05, A8 = −2.01824e−05

-continued

Group focal length

| f1 = −18.47 | f2 = 10.80 |
|---|---|

Zoom data

|  | WE | ST | TE |
|---|---|---|---|
| IH | 3.84 | 3.84 | 3.84 |
| focal length | 6.80 | 13.74 | 19.60 |
| Fno. | 4.06 | 5.12 | 6.00 |
| 2ω (°) | 67.22 | 32.30 | 22.42 |
| BF | 10.93 | 14.98 | 18.41 |
| Total length | 39.69 | 28.92 | 28.01 |
| d3 | 20.75 | 5.93 | 1.59 |
| d10 | 9.44 | 13.50 | 16.93 |

A zoom lens system of the sixth embodiment has a structure similar to a structure of the zoom lens system of the first embodiment.

A zoom lens system of the seventh embodiment has a structure similar to a structure of the zoom lens system of the second embodiment.

A zoom lens system of the eighth embodiment has a structure similar to a structure of the zoom lens system of the third embodiment.

A zoom lens system of the ninth embodiment has a structure similar to a structure of the zoom lens system of the fourth embodiment.

A zoom lens system of the tenth embodiment has a structure similar to a structure of the zoom lens system of the fifth embodiment.

Data of image height and total image angle in example 6 are as shown below.

Zoom data

|  | WE | ST | TE |
|---|---|---|---|
| IH | 3.60 | 3.84 | 3.84 |
| focal length | 7.51 | 13.50 | 21.62 |
| Fno. | 3.71 | 4.68 | 6.00 |
| 2ω (°) | 58.16 | 32.66 | 20.13 |

Data of image height and total image angle in example 7 are as shown below.

Zoom data

|  | WE | ST | TE |
|---|---|---|---|
| IH | 3.59 | 3.84 | 3.84 |
| focal length | 6.80 | 13.73 | 19.60 |
| Fno. | 4.07 | 5.12 | 6.00 |
| 2ω (°) | 62.62 | 32.38 | 22.46 |

Data of image height and total image angle in example 8 are as shown below.

Zoom data

|  | WE | ST | TE |
|---|---|---|---|
| IH | 3.57 | 3.84 | 3.84 |
| focal length | 6.80 | 13.74 | 19.60 |
| Fno. | 3.90 | 5.04 | 6.00 |
| 2ω (°) | 62.52 | 32.97 | 22.89 |

Data of image height and total image angle in example 9 are as shown below.

|  | Zoom data | | |
|---|---|---|---|
|  | WE | ST | TE |
| IH | 3.84 | 3.84 | 3.84 |
| IH | 3.60 | 3.84 | 3.84 |
| focal length | 7.51 | 13.50 | 21.62 |
| Fno. | 3.70 | 4.68 | 6.00 |
| 2ω (°) | 58.24 | 32.66 | 20.13 |

Data of image height and total image angle in example 10 are as shown below.

|  | Zoom data | | |
|---|---|---|---|
|  | WE | ST | TE |
| IH | 3.60 | 3.84 | 3.84 |
| focal length | 6.80 | 13.74 | 19.60 |
| Fno. | 4.06 | 5.12 | 6.00 |
| 2ω (°) | 62.90 | 32.30 | 22.42 |

Aberration diagrams at the time of the infinite object point focusing of the embodiment from the first embodiment to the fifth embodiment are shown in FIG. 6A to FIG. 10C. In these aberration diagrams, FIG. 6A, FIG. 7A, FIG. 8A, FIG. 9A, and FIG. 10A show a spherical aberration (SA), an astigmatism (AS), a distortion (DT), and a chromatic aberration of magnification (CC) respectively, at the wide angle end, FIG. 6B, FIG. 7B, FIG. 8B, FIG. 9B, and FIG. 10B show a spherical aberration (SA), an astigmatism (AS), a distortion (DT), and achromatic aberration of magnification (CC) respectively, at the intermediate focal length state, and FIG. 6C, FIG. 7C, FIG. 8C, FIG. 9C, and FIG. 10C show a spherical aberration (SA), an astigmatism (AS), a distortion (DT), and a chromatic aberration of magnification (CC) at the telephoto end. In each diagram, 'ω' shows a half image angle.

Condition values of each of the embodiments are as shown below.

when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image

|  |  | Ex. 1, 6 | Ex. 2, 7 | Ex. 3, 8 | Ex. 4, 9 | Ex. 5, 10 |
|---|---|---|---|---|---|---|
| (1) | $(r_{L11f}+r_{L11r})/(r_{L11f}-r_{L11r})$ | 0.176 | 0.144 | 0.239 | 0.106 | 0.112 |
| (2) | $N_s$ | 2 | 2 | 2 | 2 | 2 |
| (3) | $D_{G1}/f_w$ | 0.230 | 0.243 | 0.243 | 0.226 | 0.243 |
| (4) | $D_{G2}/f_w$ | 0.639 | 0.941 | 1.993 | 0.639 | 0.941 |
| (5) | $|f_{G2a}|/f_w$ | 1.330 | 6.510 | 158.940 | 1.330 | 9.430 |
| (6) | $N_{G2}$ | 3 | 4 | 5 | 3 | 4 |
| (7) | $nd_{G1L1}$ | 1.75500 | — | — | 1.75500 | — |
| (8) | $vd_{G1L1}$ | — | 81.54 | 81.54 | — | 81.54 |
| (9) | $(r_{L12f}+r_{L12r})/(r_{L12f}-r_{L12r})$ | -1.299 | -5.912 | -8.390 | -1.451 | -4.823 |
| (10) | $\Delta G2/f_w$ | 1.067 | 1.189 | 1.091 | 1.062 | 1.101 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, is carried out electrically. A basic concept for the digital correction of the distortion of an image will be described below.

Figure 11:
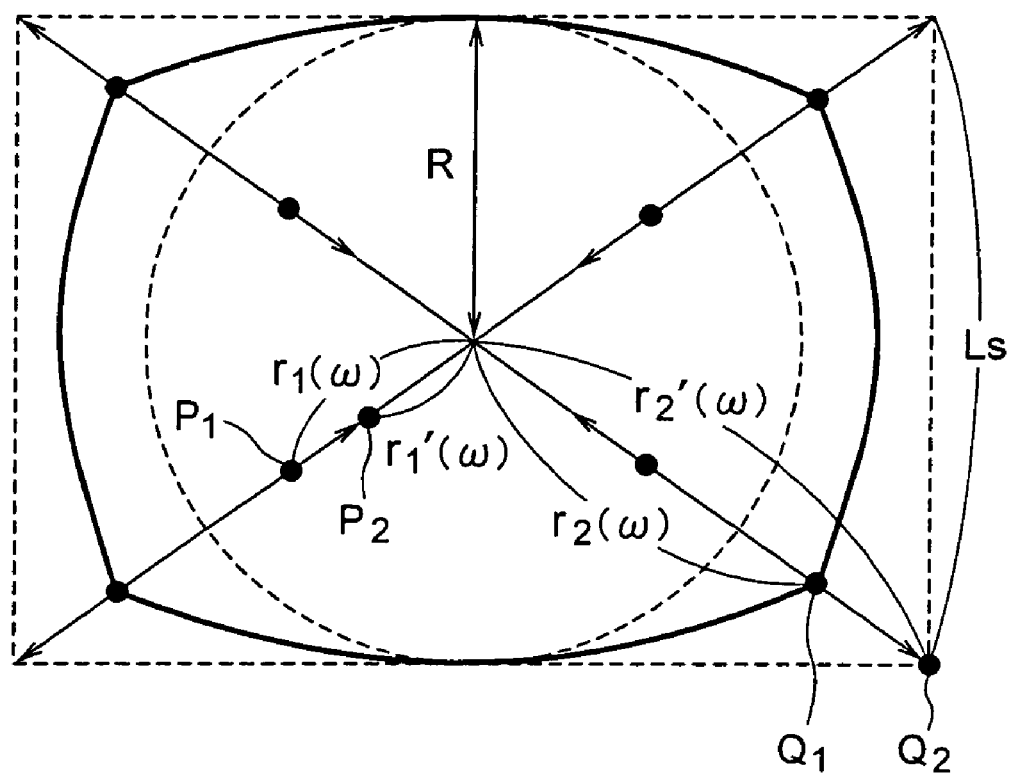
FIG. 11 is a diagram illustrating correction of distortion.

For example, as shown in FIG. 11, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 11, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan \omega \; (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 \, Ls$$

where, Ls is a length of a short side of the effective image pickup surface.

It is preferable that the radius R satisfies the following conditional expression.

$$0.3 \, Ls \leq R \leq 0.6 \, Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided maybe calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f>y/\tan \omega.$$

In other words, when the focal length f of the imaging system, and the image height y are let to be fixed, a value of ω becomes large.

(Digital Camera)

Figure 12:
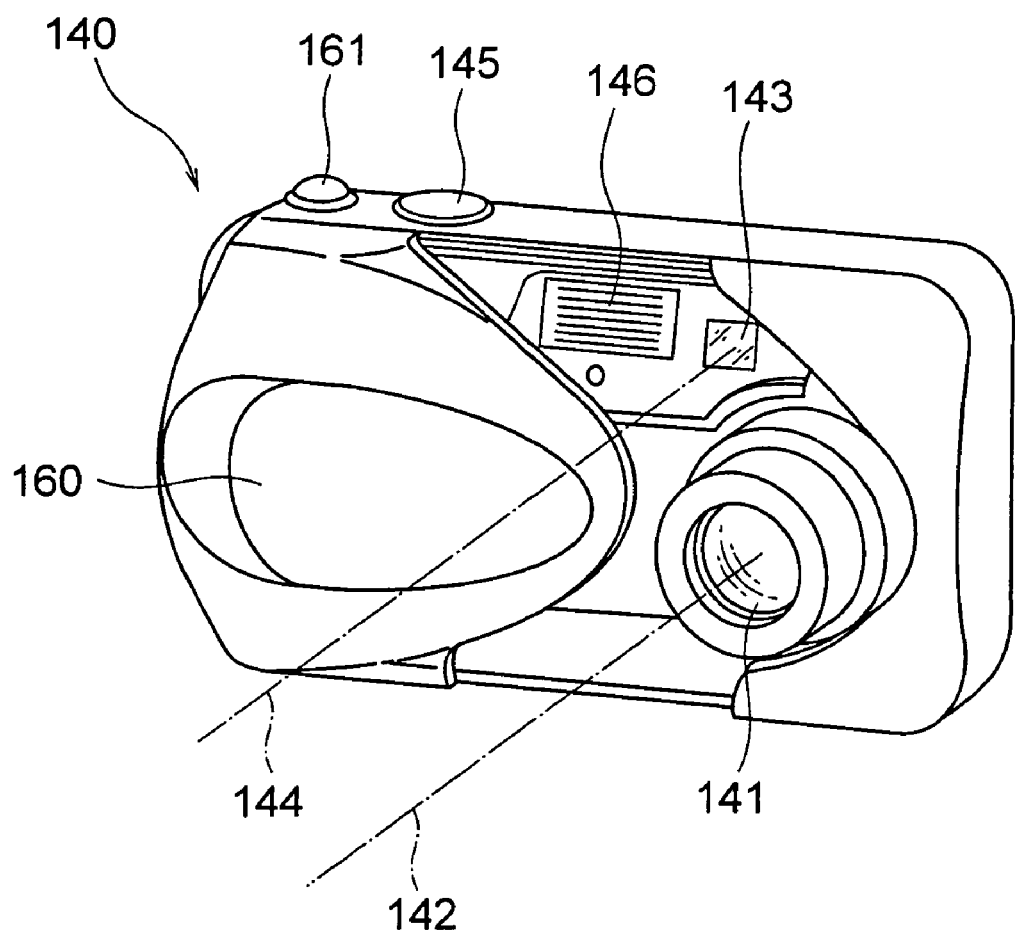
FIG. 12 is a front perspective view showing an outer appearance of a digital camera equipped with a zoom lens according to the present invention.
Figure 13:
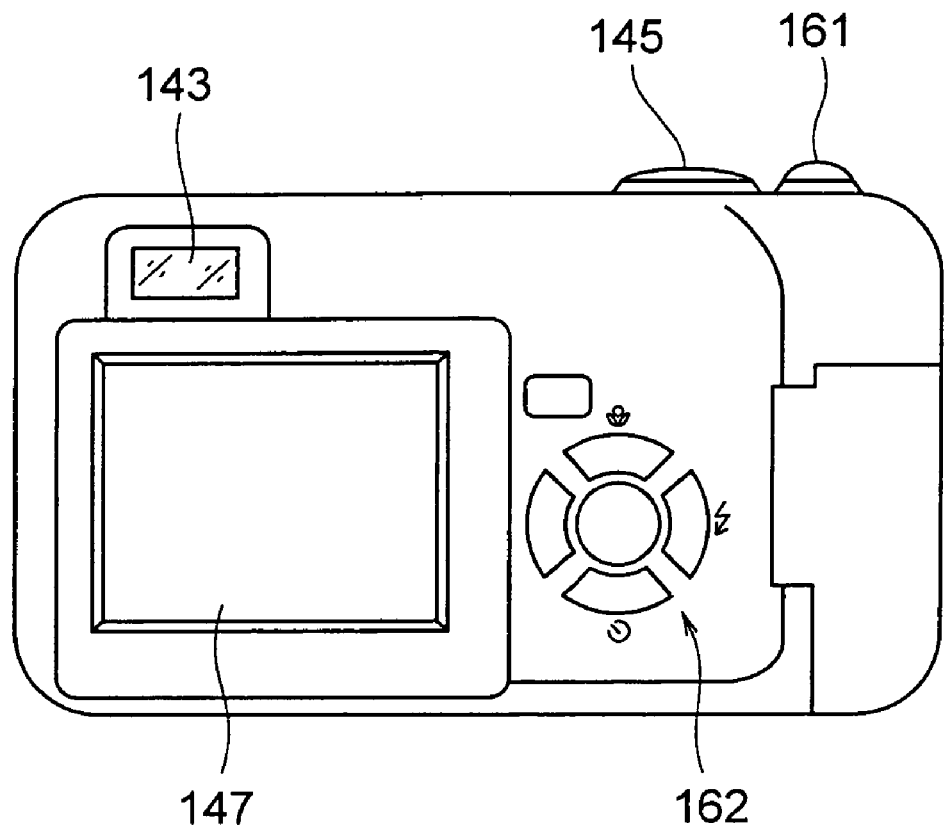
FIG. 13 is a rear perspective view of the digital camera.
Figure 14:
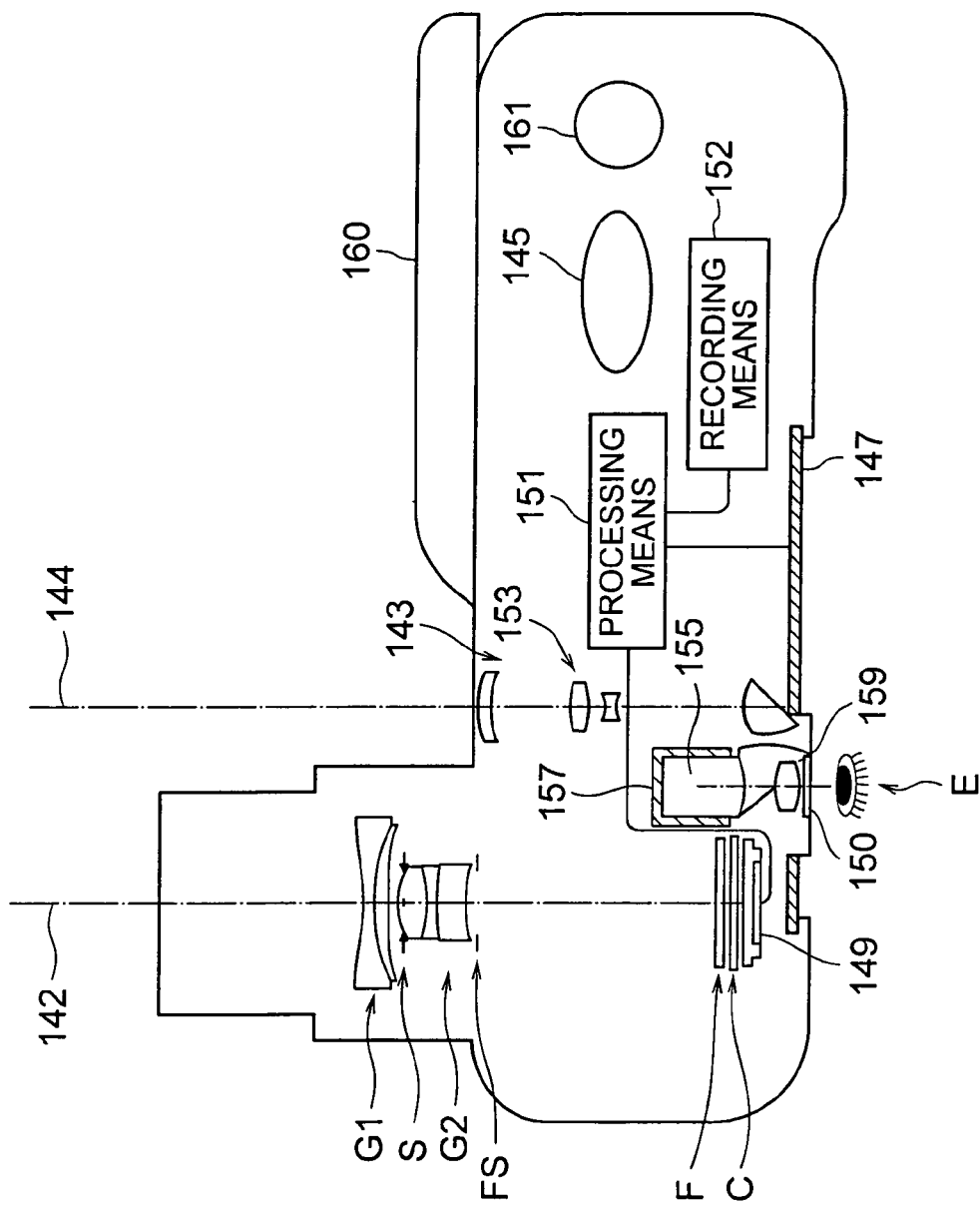
FIG. 14 is a cross sectional view of the digital camera.

FIG. 12 to FIG. 14 are conceptual diagrams of a structure of a digital camera according to the present invention in which a zoom lens system described above is incorporated in a taking optical system 141. FIG. 12 is a front perspective view showing an appearance of a digital camera 140, FIG. 13 is a rear perspective view of the same, and FIG. 14 is a schematic cross-sectional view showing a structure of the digital camera 140. In FIG. 12 and FIG. 14, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 12, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 15:
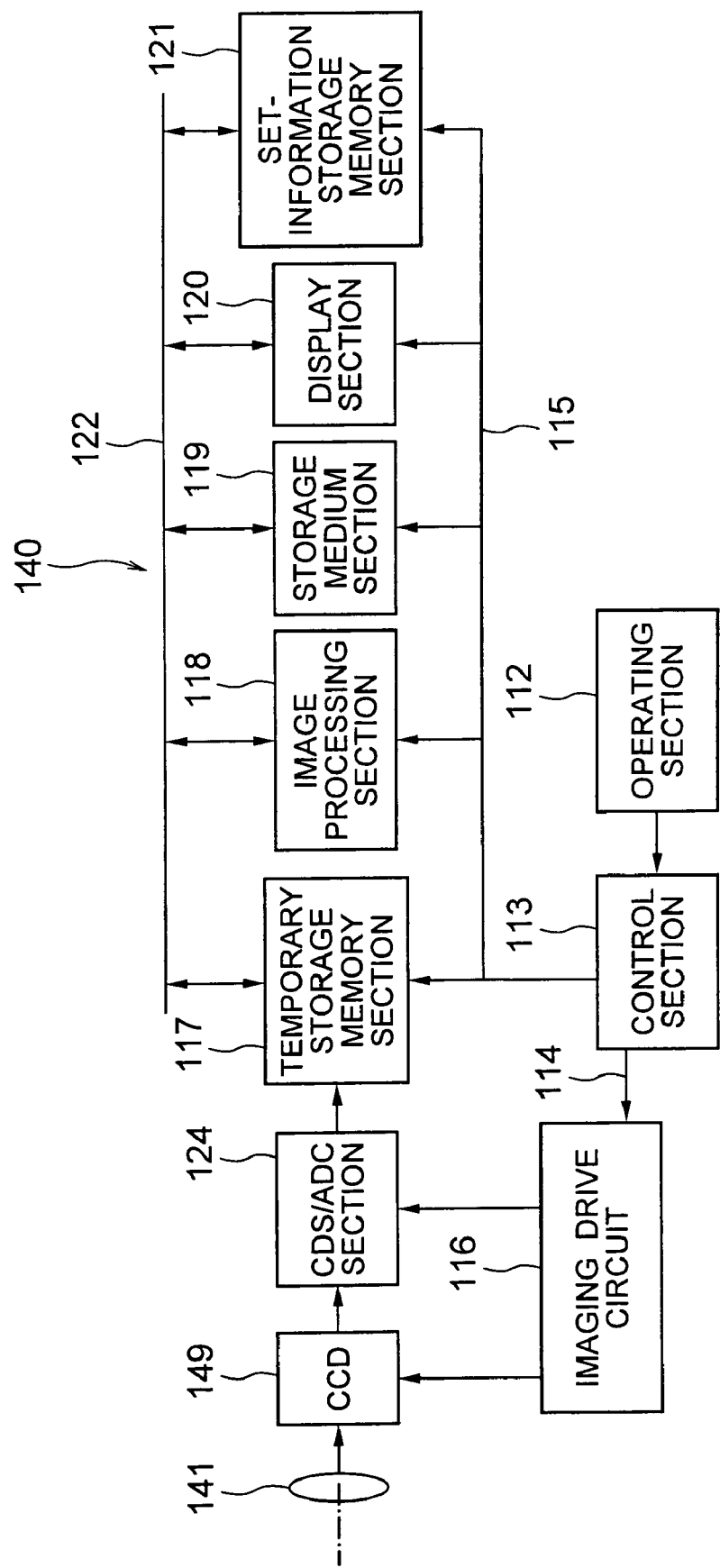
FIG. 15 is a block diagram of an internal circuit of a principal portion of the digital camera.

FIG. 15 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 15, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As per the above, the two-unit zoom lens according to the present invention is advantageous in reducing the size and in achieving good performance. In addition, in the two-unit zoom lens according to the present invention, influence of decentering of lenses from one another is easily reduced.

According to the present invention, there can be provided a zoom lens that is advantageous in reducing the size and in achieving good performance and in which influence of decentering of lenses from one another is easily reduced and an image pickup apparatus equipped with such a two-unit zoom lens.

What is claimed is:

1. A two-unit zoom lens comprising, in order from an object side thereof:
   a first lens unit having a negative refracting power; and
   a second lens unit having a positive refracting power, wherein
   during zooming from a wide angle end to a telephoto end, a distance between the first lens unit and the second lens unit decreases,
   the first lens unit comprises a negative lens component in the form of a cemented lens component having a negative refracting power,
   the negative lens component comprises, in order from the object side, a negative lens having a concave surface directed toward the image side and a positive lens having a convex surface directed toward the object side,
   the total number of lens component included in the first lens unit is one, and
   the second lens unit comprises a cemented lens component having at least one negative lens and a positive lens, where the term "lens component" refers to a lens member whose surfaces that are in contact with air on an optical axis include only two surfaces, one being an object side surface and the other being an image side surface.

2. The two-unit zoom lens according to claim 1, wherein the second lens unit comprises at least one negative lens and a plurality of positive lenses,
   at least three lenses among the lenses in the second lens unit are in contact with adjacent lenses, and
   the total number of lens components included in the second lens unit is two or less.

3. The two-unit zoom lens according to claim 1, wherein the negative lens component in the first lens unit has an aspheric cemented surface.

4. The two-unit zoom lens according to claim 1, wherein the negative lens component in the first lens unit has a spherical cemented surface.

5. The two-unit zoom lens according to claim 1, wherein the negative lens in the first lens unit has a biconcave shape that satisfies the following condition:

$$-0.95 < (r_{L11f} + r_{L11r})/(r_{L11f} - r_{L11r}) < 0.95 \quad (1)$$

where, $r_{L11f}$ is a paraxial radius of curvature of an object side surface of the negative lens in the first lens unit, and $r_{L11r}$ is a paraxial radius of curvature of an image side surface of the negative lens in the first lens unit.

6. The two-unit zoom lens according to claim 1, wherein the second lens unit satisfies the following condition:

$$1 \leq N_s \leq 3 \quad (2)$$

where $N_s$ is the total number of cemented surfaces in the second lens unit.

7. The two-unit zoom lens according to claim 1, wherein all the lens components included in the two-unit zoom lens are cemented lens components.

8. The two-unit zoom lens according to claim 1, wherein the first lens unit satisfies the following condition:

$$0.05 < D_{G1}/f_w < 0.8 \quad (3)$$

where $D_{G1}$ is a thickness of the first lens unit on the optical axis, and $f_w$ is a focal length of the two-unit zoom lens at the wide angle end.

9. The two-unit zoom lens according to claim 1, wherein the second lens unit satisfies the following condition:

$$0.1 < D_{G2}/f_w < 5.0 \quad (4)$$

where $D_{G2}$ is a thickness of the second lens unit on the optical axis, and $f_w$ is a focal length of the two-unit zoom lens at the wide angle end.

10. The two-unit zoom lens according to claim 1, wherein a cemented lens component that has the largest focal length, in absolute value, among the cemented lens components in the second lens unit satisfies the following condition:

$$0.5 < |f_{G2a}|/f_w < \infty \quad (5)$$

where $f_{G2a}$ is the focal length of the cemented lens component that has the largest focal length, in absolute value, among the cemented lens components in the second lens unit, and $f_w$ is a focal length of the two-unit zoom lens at the wide angle end.

11. The two-unit zoom lens according to claim 1, wherein the second lens unit satisfies the following condition:

$$3 \leq N_{G2} \leq 6 \quad (6)$$

where $N_{G2}$ is the total number of lenses included in the second lens unit.

12. The two-unit zoom lens according to claim 1, wherein the negative lens in the first lens unit satisfies the following condition:

$$nd_{G1L1} > 1.75 \quad (7)$$

where $nd_{G1L1}$ is a refractive index of the negative lens in the first lens unit.

13. The two-unit zoom lens according to claim 1, wherein the negative lens in the first lens unit satisfies the following condition:

$$vd_{G1L1} > 60 \tag{8}$$

where $vd_{G1L1}$ is an Abbe number of the negative lens in the first lens unit.

14. The two-unit zoom lens according to claim 1, wherein the positive lens in the first lens unit has a shape that satisfies the following condition:

$$-40.0 < (r_{L12f} + r_{L12r})/(r_{L12f} - r_{L12r}) < -1.00 \tag{9}$$

where, $r_{L12f}$ is a paraxial radius of curvature of the object side surface of the positive lens in the first lens unit, and $r_{L12r}$ is a paraxial radius of curvature of the image side surface of the positive lens in the first lens unit.

15. The two-unit zoom lens according to claim 1, wherein the lens surface closest to the object side in the second lens unit is an aspheric surface.

16. The two-unit zoom lens according to claim 1, wherein the second lens unit comprises a lens component having, in order from the object side, a positive lens, a negative lens and a positive lens.

17. The two-unit zoom lens according to claim 16, wherein the total number of the lens component included in the second lens unit is one.

18. The two-unit zoom lens according to claim 1, wherein the second lens unit comprises two lens components each of which has a cemented surface, and the total number of the lens components included in the second lens unit is two.

19. The two-unit zoom lens according to claim 18, wherein each of the lens components included in the second lens unit is a doublet.

20. The two-unit zoom lens according to claim 1, wherein during zooming from the wide angle end to the telephoto end, the second lens unit moves while satisfying the following condition:

$$0.5 < \Delta G2/f_w < 3.0 \tag{10}$$

where $\Delta G2$ is the amount of displacement of the position of the second lens unit at the telephoto end from the position thereof at the wide angle end, wherein displacements toward the object side are represented by positive values.

21. An image pickup apparatus comprising:
a two-unit zoom lens according to claim 1, and
an image pickup element disposed on an image side of the two-unit zoom lens that converts an optical image formed by the two-unit zoom lens into an electrical signal.

22. The image pickup apparatus according to claim 21 comprising an image transformation section that transforms, by image processing, the electrical signal, which contains a distortion due to the two-unit zoom lens, into an image signal in which the distortion is corrected.

* * * * *